US007455490B1

(12) United States Patent
Goosen

(10) Patent No.: US 7,455,490 B1
(45) Date of Patent: Nov. 25, 2008

(54) WHEELCHAIR HOLDING DEVICE

(76) Inventor: Gregory F Goosen, 11845 Edgerton, Cedar Springs, MI (US) 49319

( * ) Notice: Subject to any disclaimer, the term of this patent is extended or adjusted under 35 U.S.C. 154(b) by 274 days.

(21) Appl. No.: 11/185,127

(22) Filed: Jul. 20, 2005

Related U.S. Application Data

(60) Provisional application No. 60/589,755, filed on Jul. 21, 2004.

(51) Int. Cl.
*B60P 3/06* (2006.01)

(52) U.S. Cl. .......................................................... 410/7

(58) Field of Classification Search ..................... 410/2, 410/3, 4, 7, 9–12, 18–19, 21–23; 296/65.04
See application file for complete search history.

(56) References Cited

U.S. PATENT DOCUMENTS

| | | | |
|---|---|---|---|
| 1,835,840 | A | 12/1931 | Barclay |
| 3,937,376 | A | 2/1976 | Ewing |
| 4,019,752 | A | 4/1977 | Leon et al. |
| 4,027,747 | A | 6/1977 | Moorman, Jr. |
| 4,060,271 | A | 11/1977 | Williams |
| 4,093,303 | A | 6/1978 | Nelson |
| 4,103,934 | A | 8/1978 | Arnholt et al. |
| 4,113,270 | A | 9/1978 | Barecki |
| 4,170,368 | A | 10/1979 | Southward et al. |
| 4,257,644 | A | 3/1981 | Stephens |
| 4,266,822 | A | 5/1981 | Barecki et al. |
| 4,407,616 | A | 10/1983 | Hinze |
| 4,455,046 | A | 6/1984 | Linderoth |
| 4,457,663 | A | 7/1984 | Hems et al. |
| 4,458,919 | A | 7/1984 | Kawashima et al. |
| 4,511,171 | A | 4/1985 | Petersen |
| 4,518,057 | A | 5/1985 | McCallum |
| 4,520,893 | A | 6/1985 | Keough |
| 4,601,620 | A | 7/1986 | Bugger et al. |
| 4,623,289 | A | 11/1986 | Apostolos |
| 4,671,713 | A | 6/1987 | Lenkman |
| 4,679,807 | A | 7/1987 | Raybon |
| 4,688,843 | A | 8/1987 | Hall |
| 4,690,364 | A | 9/1987 | Constantin |
| 4,805,954 | A | 2/1989 | Lazaroff |
| 4,826,193 | A | 5/1989 | Davis |

(Continued)

FOREIGN PATENT DOCUMENTS

| | | |
|---|---|---|
| DE | 3927 736 A1 | 2/1991 |

(Continued)

OTHER PUBLICATIONS

American Seating Company Restraint Systems brochure, 1996, 2 pages.

*Primary Examiner*—H Gutman
(74) *Attorney, Agent, or Firm*—Van Dyke, Gardner, Linn & Burkhart LLP

(57) ABSTRACT

A wheelchair holding device for holding a wheelchair at a wheelchair holding area of a vehicle is movable between a storage position and a wheelchair holding position, where at least a portion of the wheelchair holding device is positioned at the wheelchair holding area. The wheelchair holding device includes an attachment element that is configured to attach to a wheelchair positioned at the wheelchair holding area. The wheelchair holding device is interconnected to a support member or seat of the vehicle and is moved toward the wheelchair holding position as the support member is moved toward the non-use position.

51 Claims, 17 Drawing Sheets

U.S. PATENT DOCUMENTS 4,852,779 A 8/1989 Berg
4,886,403 A 12/1989 Gresham
4,966,392 A 10/1990 Featon et al.
4,973,022 A 11/1990 Mayland
4,995,775 A 2/1991 Gresham
5,026,225 A 6/1991 McIntyre
5,137,413 A 8/1992 Ressler
5,186,585 A 2/1993 Sousa et al.
5,344,265 A 9/1994 Ullman et al.
5,391,030 A 2/1995 Lee
5,421,692 A 6/1995 Varrichio et al.
5,431,524 A 7/1995 Antal et al.
5,466,111 A 11/1995 Meyer
5,567,095 A 10/1996 James et al.
5,593,260 A 1/1997 Zimmerman
5,613,738 A 3/1997 Britton
5,628,595 A 5/1997 Harris
5,713,704 A 2/1998 Pommier et al.
5,816,763 A 10/1998 Hamann et al.
5,888,038 A 3/1999 Ditch et al.
6,015,256 A 1/2000 Mesa et al.
6,113,325 A * 9/2000 Craft ........................... 410/23
6,149,359 A 11/2000 Cardona
6,149,528 A 11/2000 Volz et al.
6,227,790 B1 5/2001 Mollick et al.
6,287,060 B1 9/2001 Girardin
6,364,594 B1 4/2002 Kagan et al.
6,406,230 B1 6/2002 Mason et al.
6,428,254 B2 8/2002 Craft
6,471,454 B1 10/2002 Koller
6,474,916 B2 11/2002 Constantin
6,524,039 B1 2/2003 Magnuson et al.
6,575,677 B2 6/2003 Craft
6,698,983 B1 3/2004 Kiernan et al.
6,776,564 B1 8/2004 Kiernan et al.
6,899,497 B2 * 5/2005 Cardona et al. ............... 410/12
6,916,056 B2 7/2005 Mitchell et al.
7,040,847 B1 * 5/2006 Cardona ........................ 410/7
7,100,718 B2 9/2006 Bancroft
7,104,740 B2 9/2006 Girardin
7,108,466 B2 9/2006 Panzarella et al.
2001/0001031 A1 * 5/2001 Craft ............................. 410/7
2002/0110434 A1 * 8/2002 Ditch et al. .................... 410/7
2002/0114679 A1 * 8/2002 Craft ............................. 410/7
2003/0190208 A1 * 10/2003 Cardona et al. ................ 410/7
2004/0005203 A1 * 1/2004 Craft ............................. 410/7
2005/0214088 A1 * 9/2005 Acton ........................... 410/3
2006/0193708 A1 * 8/2006 Ditch et al. .................... 410/7

FOREIGN PATENT DOCUMENTS

DE 19730960 1/1999
EP 437 413 A 1/1991
FR 2554343 5/1985
FR 2761593 10/1998
GB 2 104 849 3/1983
GB 2 130 977 6/1984
GB 2188 292 A 9/1987
GB 2 300 158 10/1996
GB 2 344 081 5/2000
GB 2 344 319 6/2000
JP 11047193 2/1999
WO WO 92/15270 9/1992
WO WO 94/12 138 6/1994

* cited by examiner

WHEELCHAIR HOLDING DEVICE

CROSS REFERENCE TO RELATED APPLICATION

The present application claims benefit of U.S. provisional application Ser. No. 60/589,755, filed Jul. 21, 2004, which is hereby incorporated herein by reference in its entirety.

FIELD OF THE INVENTION

The present invention relates generally to wheelchair tie downs or holding or securement devices and, more particularly, to wheelchair tie downs or holding or securement devices for securing wheelchairs in transit vehicles, such as buses or the like.

BACKGROUND OF THE INVENTION

It is known in the art to provide a wheelchair tie down device for holding a wheelchair at an area or platform or floor of a vehicle, such as a transit vehicle or bus or the like. Examples of such devices are disclosed in U.S. Pat. Nos. 5,888,038; 6,113,325; and 6,698,983. In such applications, the device may slide or pivot from a stored or retracted position to an in-use position when it is desired to use the device. In some applications, a bus seat may first have to be moved or raised out of the way to make room for a wheelchair at the floor of the vehicle. After the seat is moved or removed, the tie down device may then be manually moved to the in-use position and may be secured or locked relative to the vehicle when in its in-use position. When the wheelchair tie down device is no longer needed, the process is reversed to unlock and move the tie down device to its storage position. The seat may then be lowered back to its normal seating position. Such devices thus require a substantial amount of manual labor by the vehicle operator or other operator to set up and store the tie down devices.

Therefore, there is a need in the art for a wheelchair tie down or holding or securing device that overcomes the shortcomings of the prior art.

SUMMARY OF THE INVENTION

The present invention provides a wheelchair tie down or holding or securing device that is automatically moved to an operative or use position when the vehicle seat is moved or raised or pivoted to a storage position to make room for a wheelchair at a wheelchair holding or securing area of the vehicle. The holding device may include an extendable or pivotable member that moves to an extended or in-use position as the seat is moved to the storage position. The member may be connected to the seat via a linkage or the like such that movement of the seat between a use position and a storage position causes a corresponding movement of the holding device member between a storage or retracted or non-use position and an extended or use position.

According to an aspect of the present invention, a combination includes a vehicle having a support member movably mounted at the vehicle and a wheelchair holding device. The support member, such as a vehicle seat or platform or table or the like, is movable between a generally horizontal use position and a storage or non-use position. The vehicle has a wheelchair holding area for positioning a wheelchair at when the support member is in the non-use position. The wheelchair holding device holds a wheelchair at the wheelchair holding area and is movable between a storage position and a wheelchair holding position, where at least a portion of the wheelchair holding device is positioned at the wheelchair holding area. The wheelchair holding device includes an attachment element that is configured to attach to a wheelchair positioned at the wheelchair holding area. The wheelchair holding device is interconnected to the support member and is moved toward the wheelchair holding position as the support member is moved toward the non-use position.

The wheelchair holding device may include an elongated member that is pivotable between the storage position and the wheelchair holding position. The attachment element may extend from the elongated member at an end region of the elongated member. The end region may be positioned at a holding location at the wheelchair holding area when the wheelchair holding device is in the wheelchair holding position and may be positioned at an area remote from the holding location when the wheelchair holding device is in the storage position. The wheelchair holding device may be interconnected to the vehicle support member or seat via a linkage that is configured to move at least a portion of the wheelchair holding device as the support member is moved between the use position and the non-use position.

The attachment element may comprise a flexible strap or belt, and may extend from a housing that retracts the attachment element at least partially therein when the attachment element is not in use. Optionally, the housing may be mounted to the vehicle and the attachment element may extend along the elongated member between the housing and the end region. Optionally, the housing may be mounted at the end region of the elongated member.

The elongated member may comprise a first member or arm and a second member or arm movably attached to the first member. The second member may move relative to the first member as the wheelchair holding device moves to the wheelchair holding position. The attachment element may extend from an end portion of the second member that is remote from the first member. The second member may be pivotally attached to the first member, and the first member may be pivotally attached to the vehicle and may be pivoted relative thereto as the support member is moved toward the non-use position.

According to another aspect of the present invention, a method for securing a wheelchair at a wheelchair holding area of a vehicle includes providing a vehicle having a wheelchair holding area and a support member at or near the wheelchair holding area. A wheelchair holding device is provided for holding a wheelchair at the wheelchair holding area. The wheelchair holding device is connected to the support member. The support member is moved from a use position to a non-use position, whereby the movement of the support member to the non-use position imparts a corresponding movement of the wheelchair holding device to move the wheelchair holding device to a wheelchair holding position, where an attachment element of the wheelchair holding device is positioned at or near the wheelchair holding area. The attachment element is connected to a wheelchair positioned at the wheelchair holding area.

The support member may comprise a vehicle seat and may be pivoted from a generally horizontal orientation to a generally vertical orientation. The movement of the support member may impart a pivotal movement of the wheelchair holding device to move the wheelchair holding device to the wheelchair holding position.

When it is desired to remove the wheelchair from the wheelchair holding area, the attachment element may be disconnected from the wheelchair and the wheelchair may be removed from the wheelchair holding area and the vehicle.

The support member or seat may be moved from the non-use position to the use position, whereby the movement of the support member toward the use position imparts a movement of the wheelchair holding device from the wheelchair holding position toward a storage position where the attachment element is remote from the wheelchair holding area.

Therefore, the present invention provides a wheelchair holding device that is movable between a storage or non-use or retracted position and an extended or wheelchair holding position in response to movement of a support member of a vehicle (such as a vehicle seat or the like) between a lowered or use position and a raised or non-use position. The wheelchair holding device is correspondingly or cooperatively moved with the vehicle seat so that an operator need only raise the seat to its storage position to set up a wheelchair holding area for a wheelchair. The present invention thus substantially reduces the manual labor that is typically otherwise involved in setting up known or conventional wheelchair holding areas. The wheelchair holding device of the present invention is thus moved to a wheelchair holding position as the vehicle seat is moved to a storage position to make room for a wheelchair. The wheelchair holding device may then be readily connected to a wheelchair positioned at the wheelchair holding area at or near to the extended or accessible wheelchair holding device.

These and other objects, advantages, purposes and features of the present invention will become apparent upon review of the following specification in conjunction with the drawings.

DESCRIPTION OF THE PREFERRED EMBODIMENTS

Figure 1:
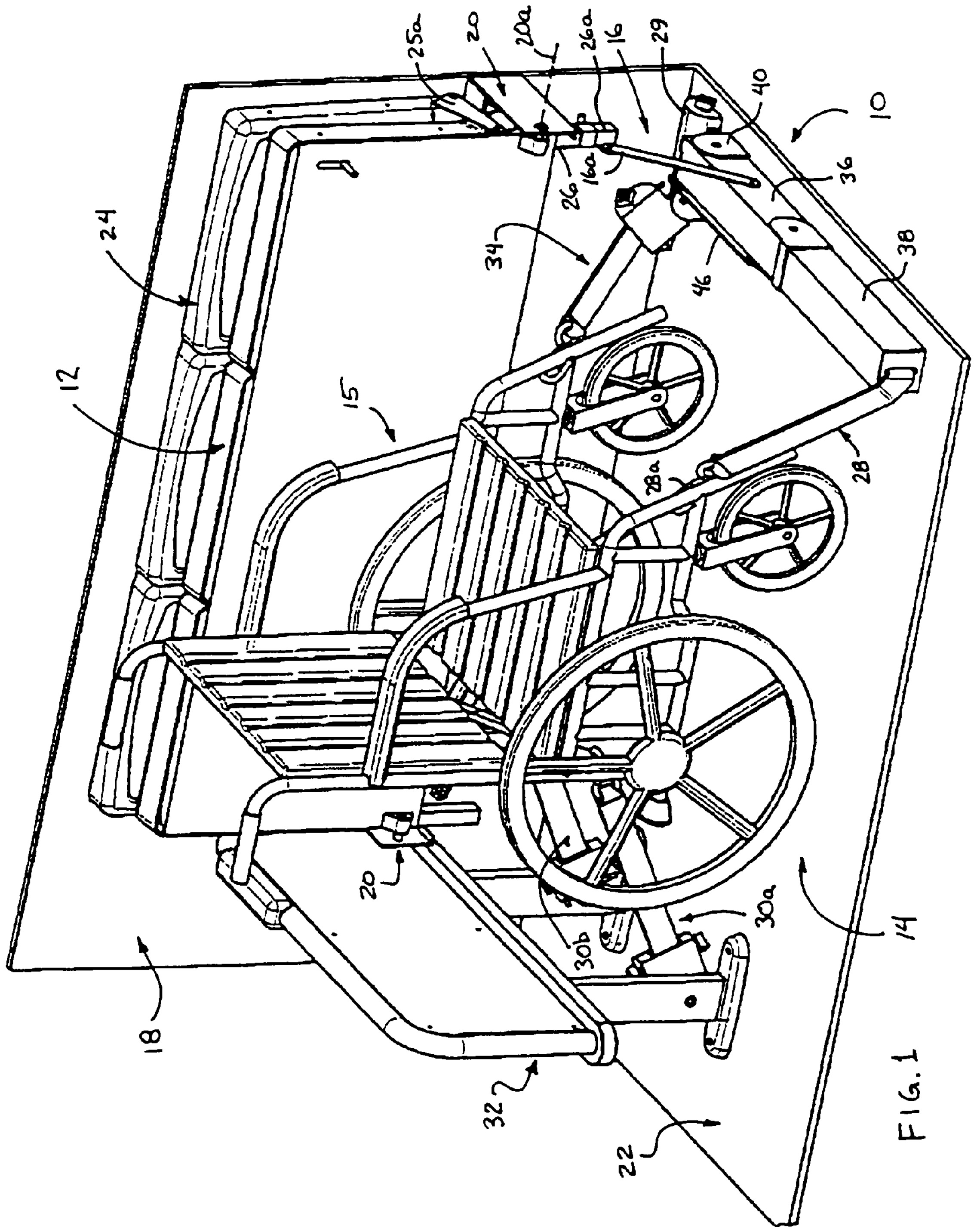
FIG. 1 is a perspective view of a wheelchair holding device in accordance with the present invention, shown holding a wheelchair at a wheelchair holding area of a vehicle.
Figure 2:
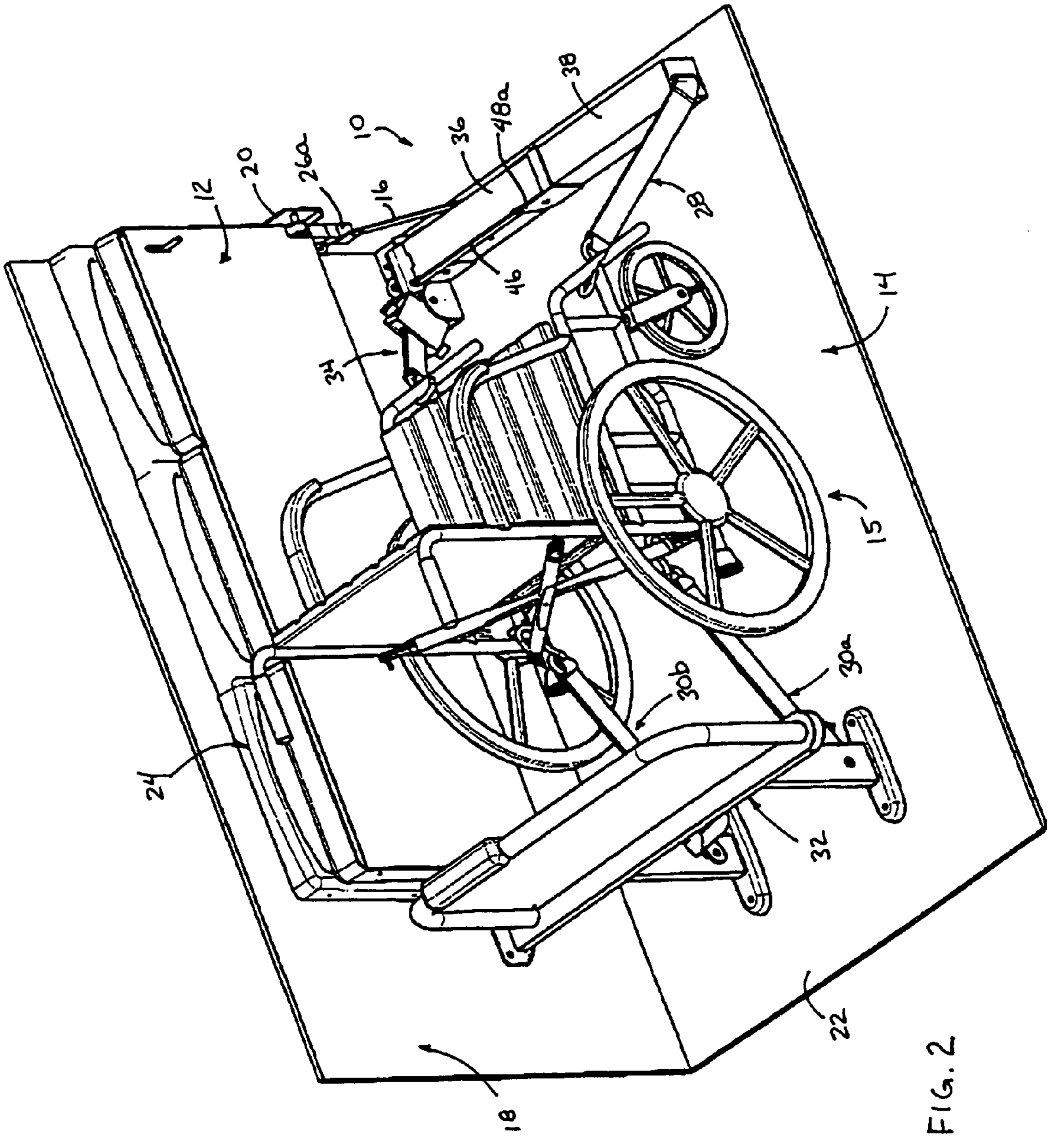
FIG. 2 is another perspective view of the wheelchair holding device and wheelchair of FIG. 1.
Figure 3:
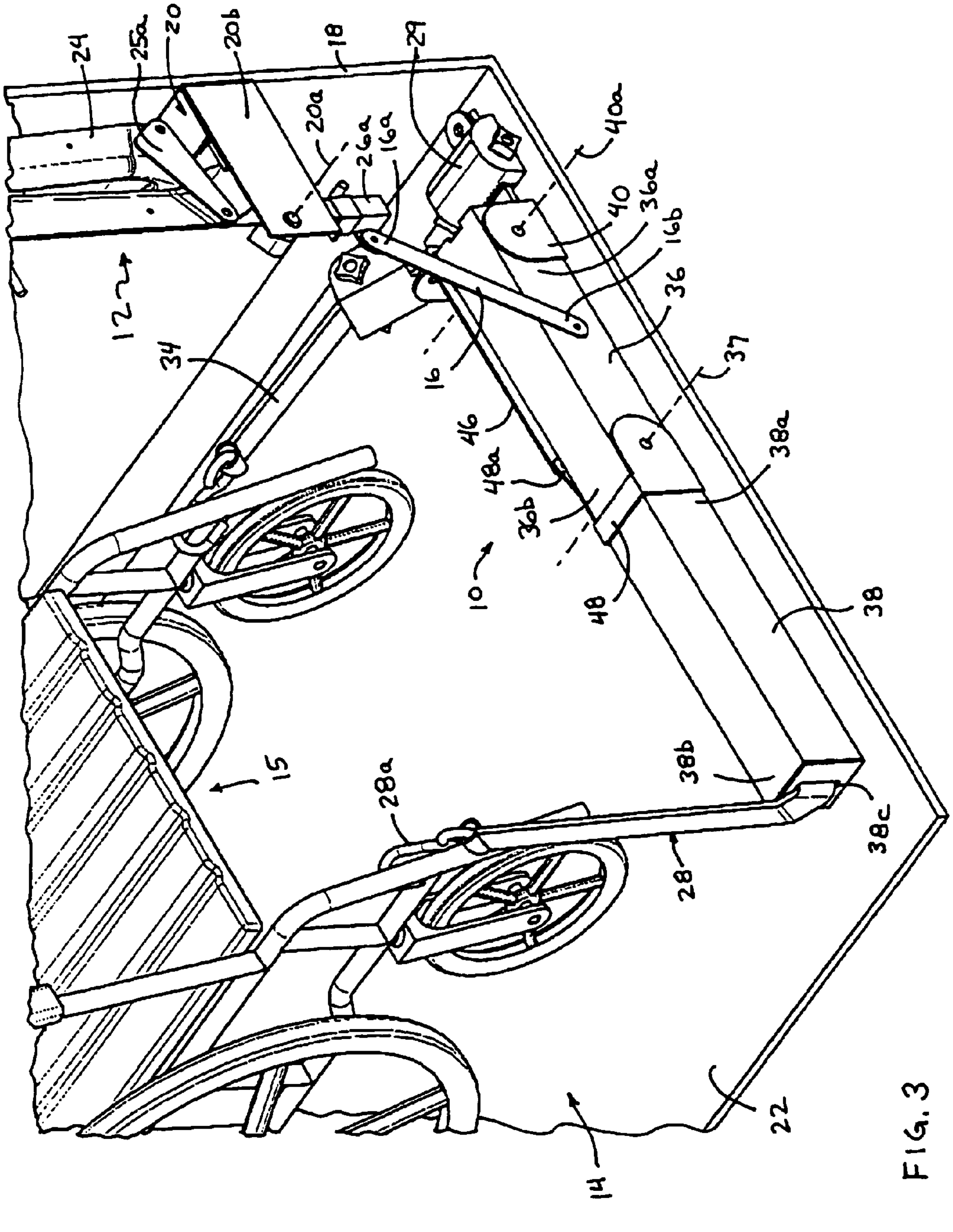
FIG. 3 is an enlarged perspective view of the wheelchair holding device of FIGS. 1 and 2.
Figure 4:
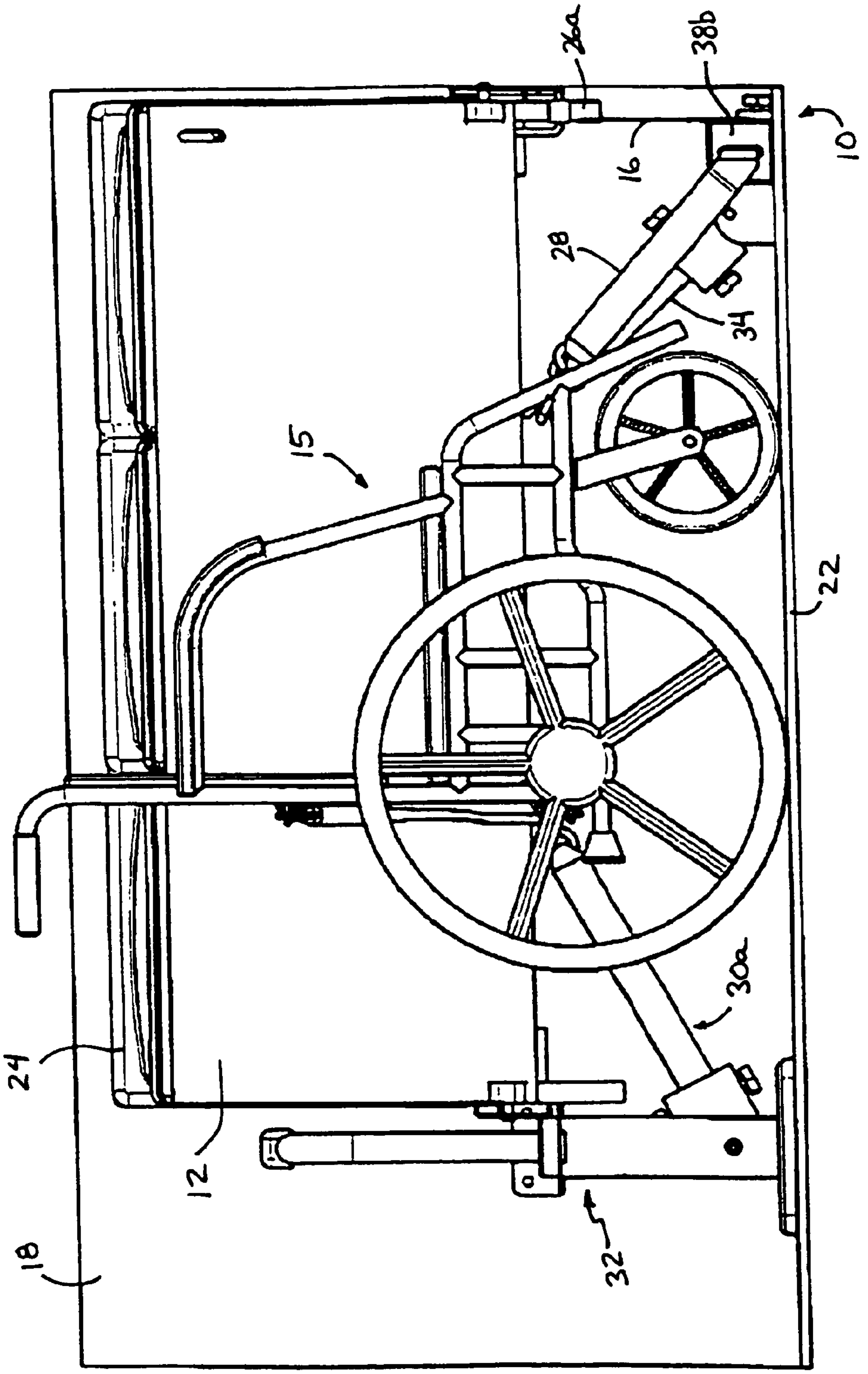
FIG. 4 is a side elevation of the wheelchair holding device and wheelchair of FIGS. 1-3.
Figure 5:
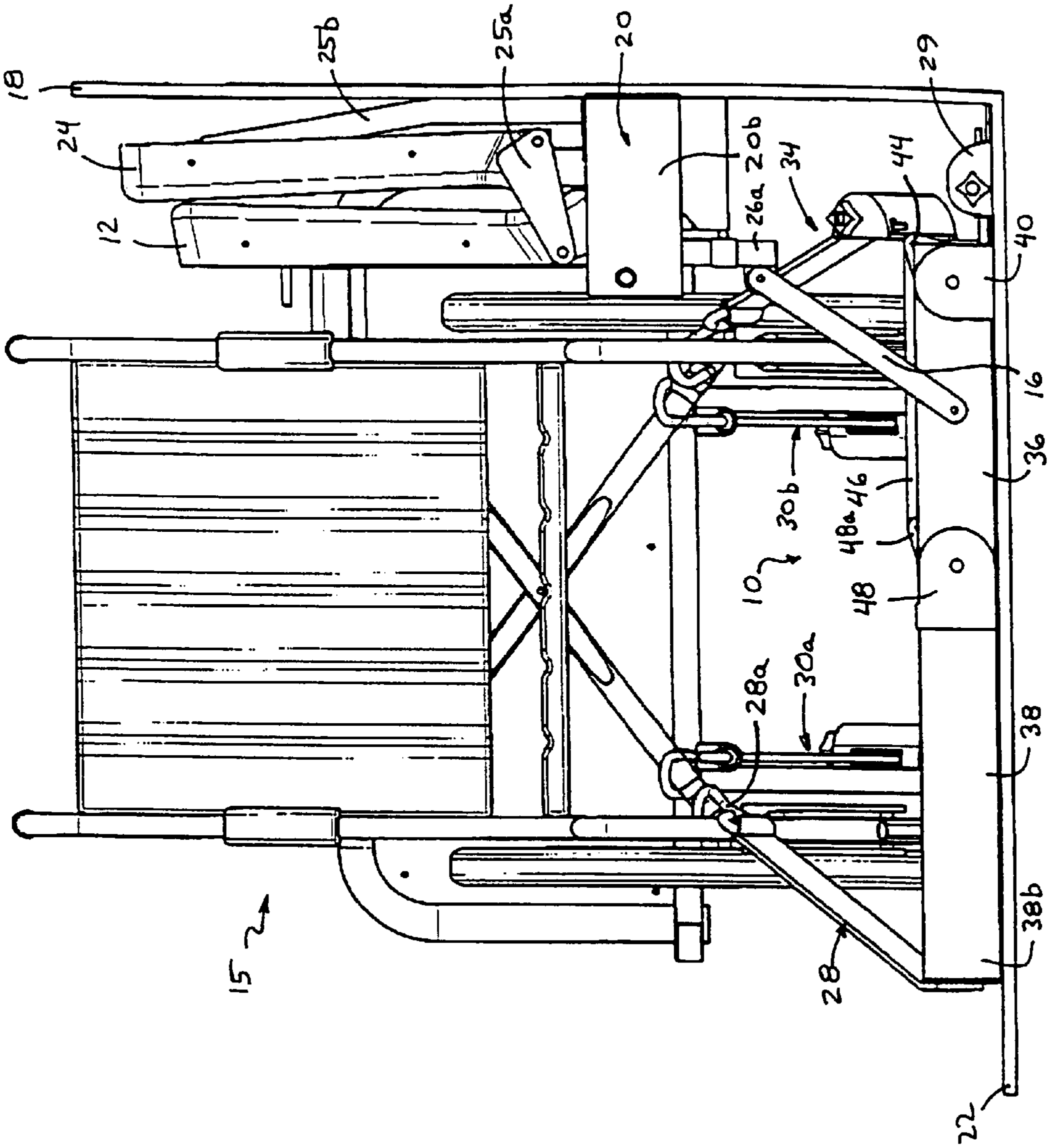
FIG. 5 is an end elevation of the wheelchair holding device and wheelchair of FIGS. 1-4.
Figure 6:
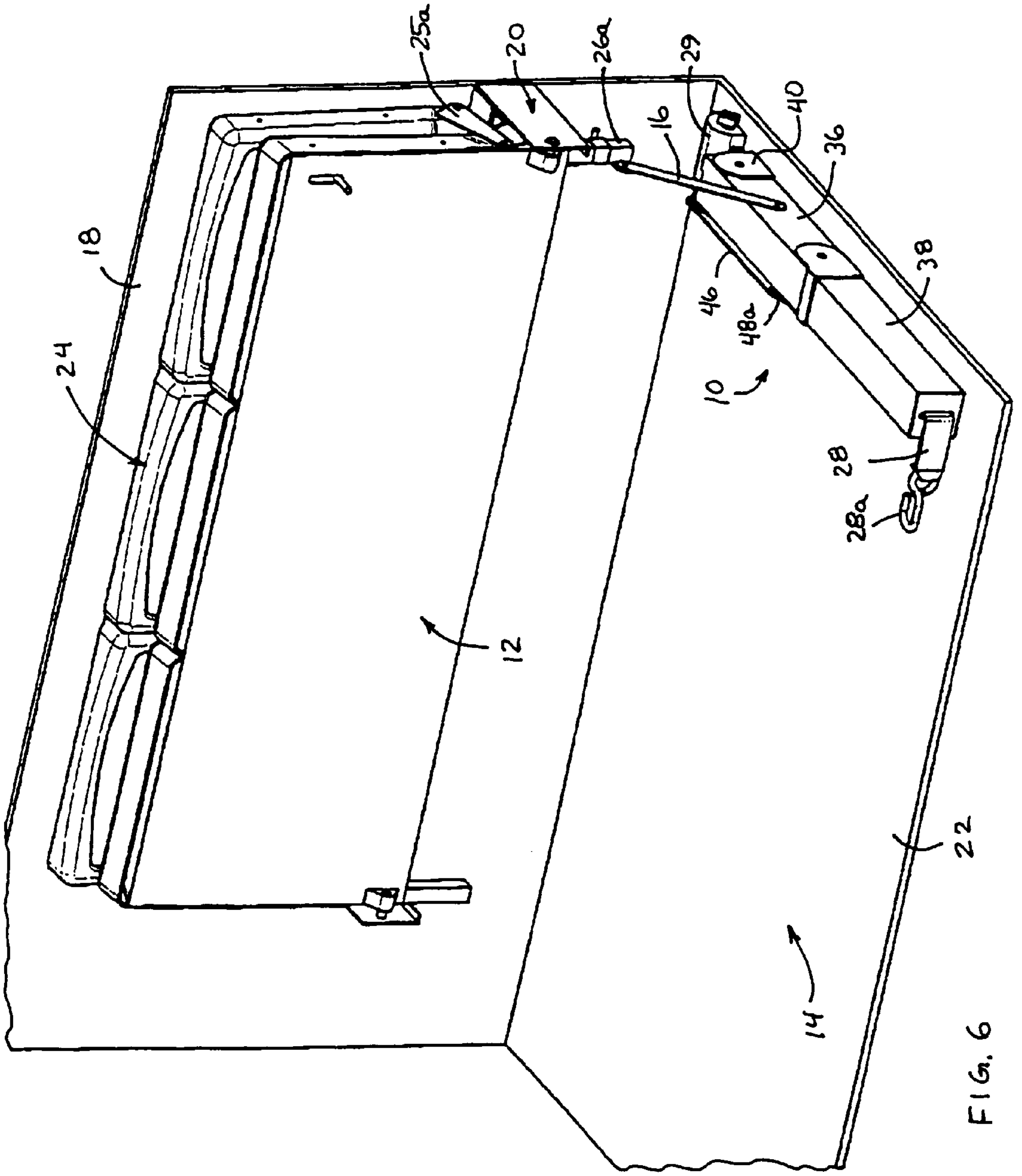
FIG. 6 is a perspective view of the wheelchair holding device of the present invention, with the wheelchair removed from the wheelchair holding area.
Figure 7:
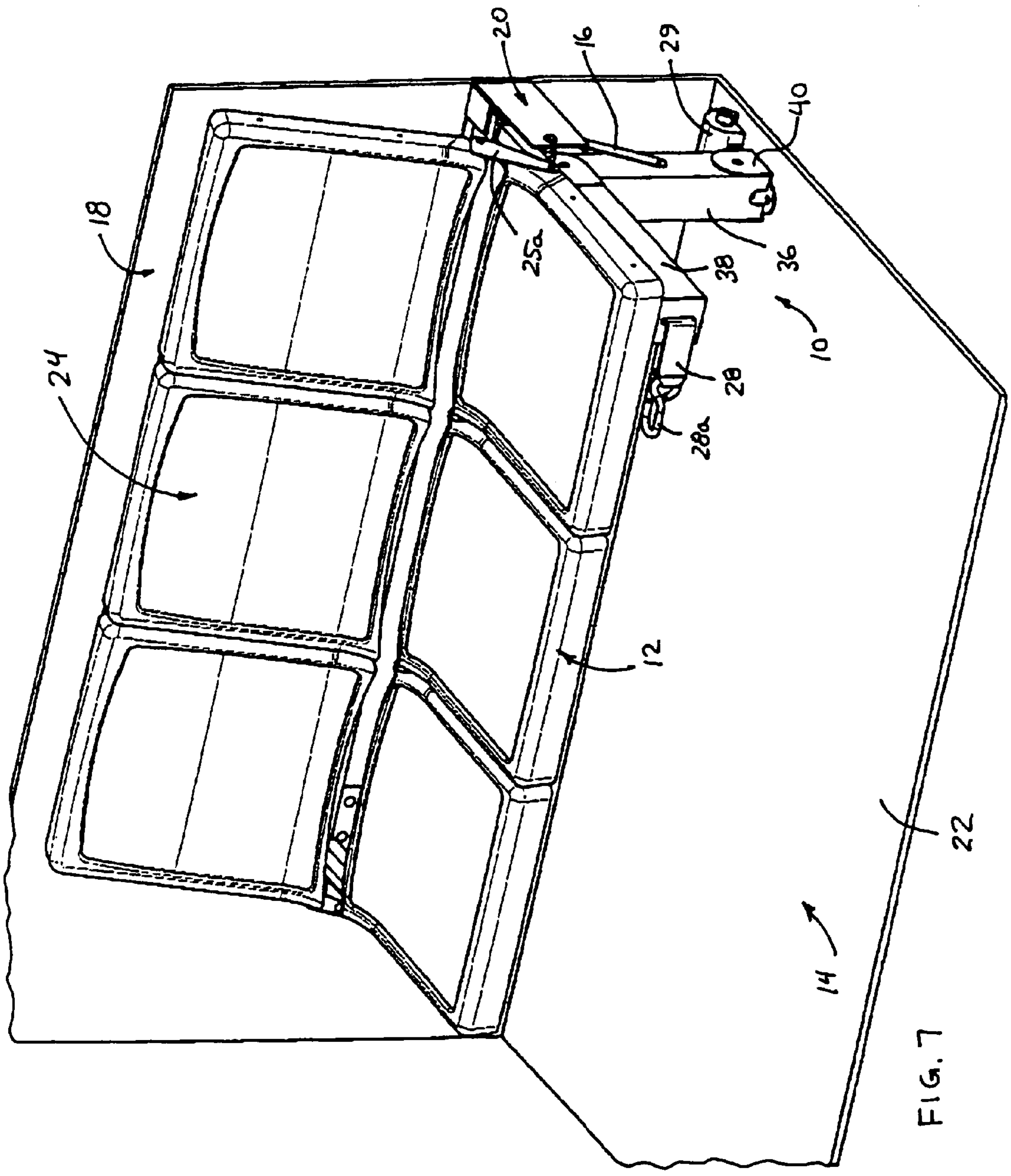
FIG. 7 is a perspective view of the wheelchair holding device of the present invention, shown in a retracted position and with the vehicle seat folded down for use.
Figure 8:
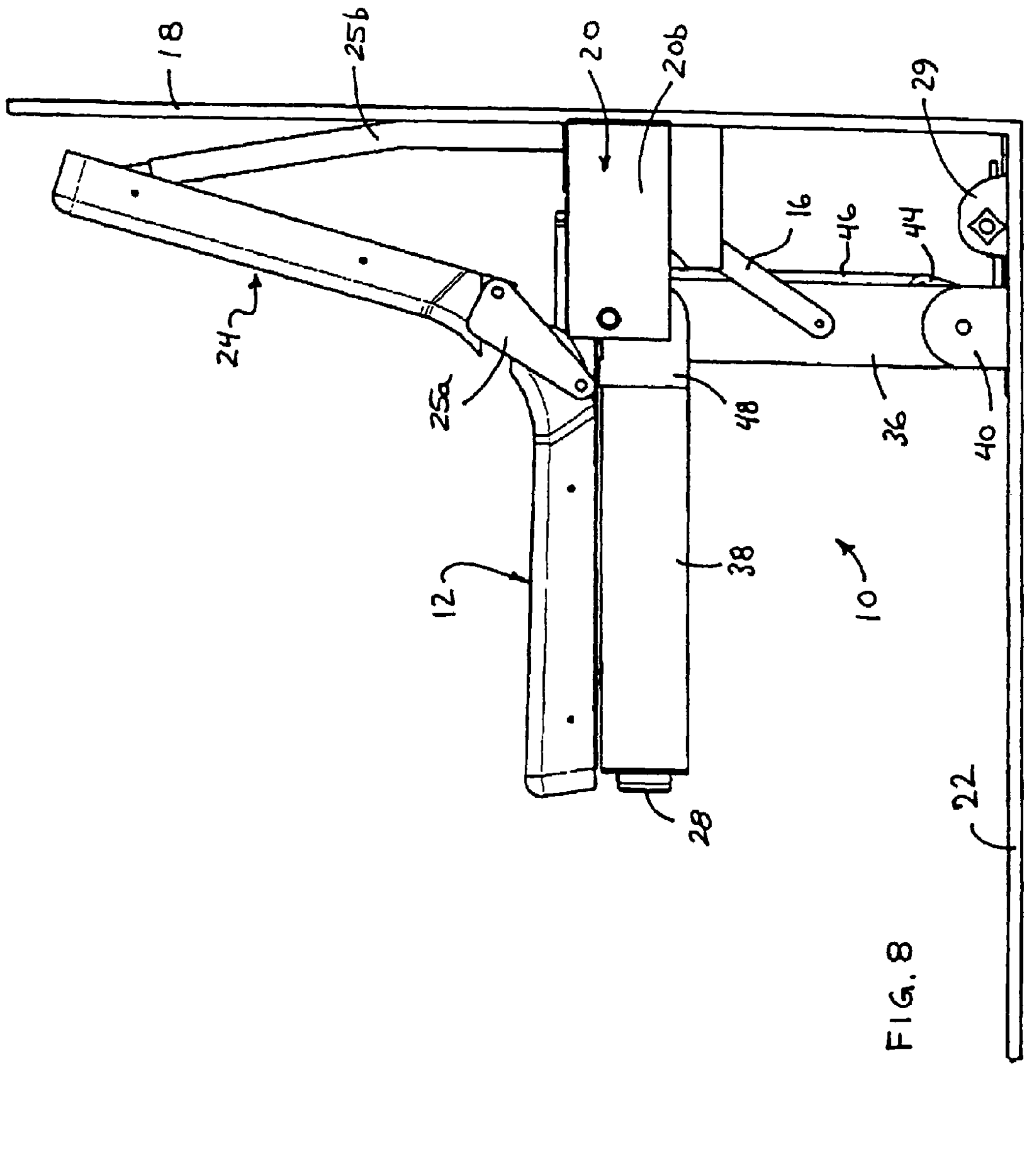
FIG. 8 is an end elevation of the wheelchair holding device and seat of FIG. 7.
Figure 9:
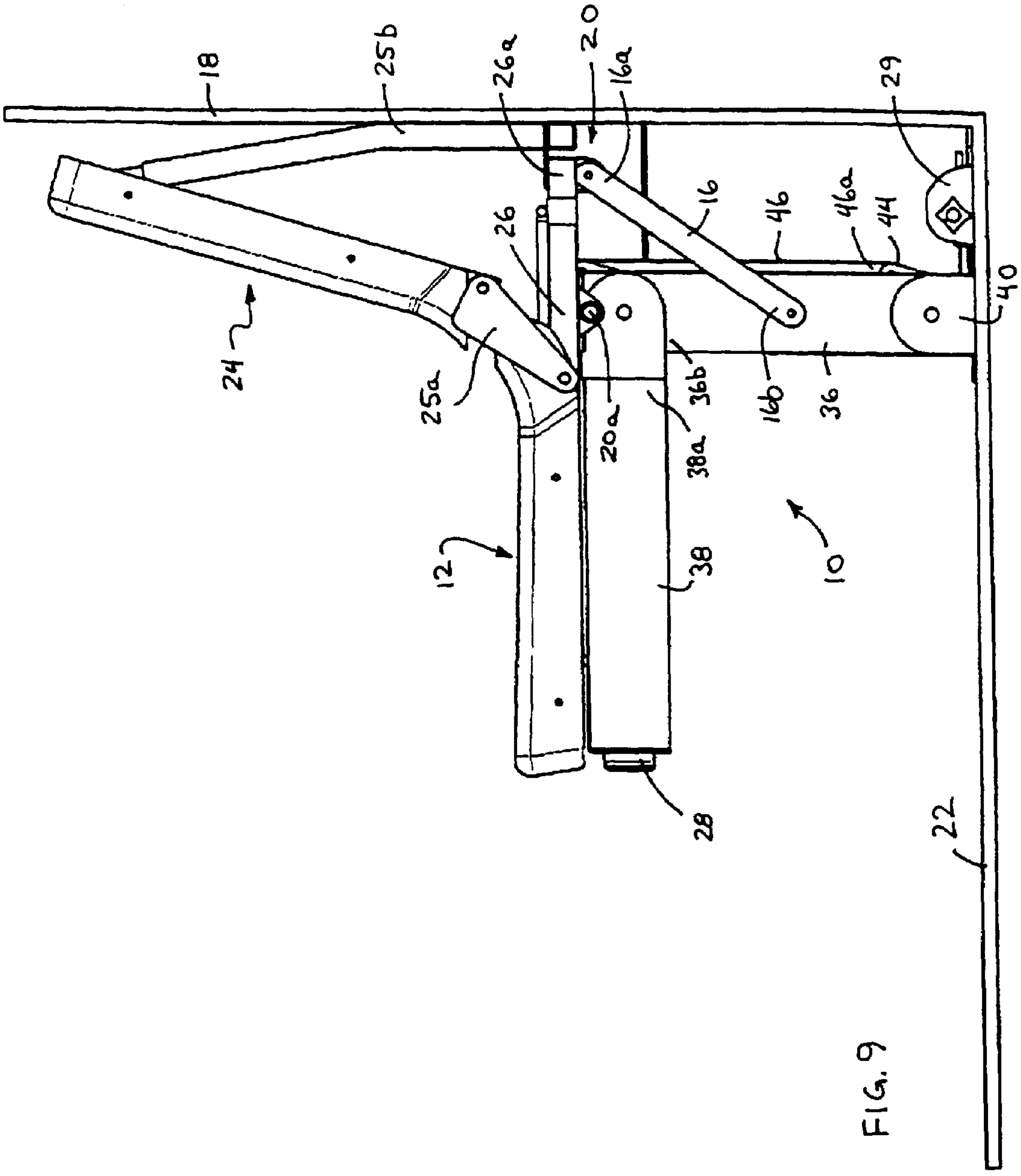
FIG. 9 is another end elevation similar to FIG. 8, with a side bracket plate removed to show additional details.

Referring now to the drawings and the illustrative embodiments depicted therein, a wheelchair holding or securing device 10 is movably connected to a support member or vehicle support or seat 12 (FIGS. 1-11). Vehicle seat 12 is movable between a lowered or use position (as shown in FIGS. 7-9), where a person may sit at the generally horizontally oriented seat, and a raised or storage or non-use position (as shown in FIGS. 1-8 and 11), where the seat is pivoted to a generally vertical orientation to make additional floor space at a wheelchair holding area 14 at which a wheelchair 15 may be placed. Likewise, holding device 10 is movable between a stored position (as shown in FIGS. 7-9) and an operative or extended or in-use position (as shown in FIGS. 1-8 and 11). Holding device 10 is connected or linked to seat 12 or otherwise cooperatively movable with seat 12, such that as seat 12 is raised or pivoted toward the storage position, holding device 10 is moved toward the extended or wheelchair holding position, and, likewise, as seat 12 is lowered toward its use position, holding device 10 is moved toward its retracted or storage position, as discussed below. In the illustrated embodiment, holding device 10 is connected to seat 12 via a linkage mechanism or link or connecting member 16, which imparts pivotal movement of holding device 10 as seat 12 is raised or lowered, as also discussed below.

Vehicle seat 12 may be positioned along a side wall 18 of a vehicle, such as a transit vehicle, such as a bus or the like. As shown in FIGS. 1-11, seat 12 may be pivotally mounted to a pair of brackets 20 that are secured to and extend from the wall 18 (or bulkhead or partition or the like) of the vehicle. Optionally, the vehicle seat may be pivotally or movably or adjustably mounted to a base or frame (not shown) or the like that is secured to the floor 22 or other portion of the vehicle, without affecting the scope of the present invention. Although shown and described as being connected to a vehicle seat such that as the seat is moved, the wheelchair holding device is correspondingly or cooperatively moved, the wheelchair holding device may be connected to or cooperatively operable with other support members or platforms or tables or the like of a vehicle, without affecting the scope of the present invention. For example, the wheelchair holding device may be coupled to a support member or platform or table or the like that is pivotable between a use position, where the support member extends at least partially into or over the wheelchair holding area, and a storage position, where the support member is moved to be remote from the wheelchair holding area to make room for a wheelchair at the wheelchair holding area.

In the illustrated embodiment, vehicle seat 12 is pivotable about a generally horizontal pivot axis 20*a* at bracket 20, so that the seat is pivotable between the lowered or use position or orientation and the raised or storage position. As shown in FIGS. 3 and 5-8, bracket 20 may include a cover plate or housing 20*b* to house or contain or conceal the bracket and pivot components of the seat and bracket (the cover plate 20*b* is removed from the illustration of FIGS. 9-11 to show additional details of the seat and bracket and linkages). When in the lowered or use position, the seat may extend from the wall or mounting brackets and may be positioned generally horizontally and at least partially at or in or over the wheelchair holding area, whereby passengers may sit at the seat of the transit vehicle. When the seat is raised or moved to the storage position, the seat may be positioned generally vertically and against or adjacent to the back rest and thus removed from the wheelchair holding area to make room for a wheelchair to be positioned at the wheelchair holding area.

The wall 18 or bracket 20 may also support a back rest 24 at or along the wall 18 (or along a partition or the like). As can be seen with reference to FIGS. 9-11, back rest 24 may be pivotally or adjustably mounted to bracket 20 and/or seat 12, such as via a mechanism or lever 25*a* connected to seat 12 and back rest 24, and a mechanism or lever or arm 25*b* connected to back rest 24 and bracket 20 or wall 18. Back rest 24 thus may pivot to a generally vertical orientation and generally against the wall as seat 12 is raised to its upright or non-use position. Alternately, the back rest may be generally fixedly attached to the bracket or to the wall or partition, without affecting the scope of the present invention.

Figure 10:
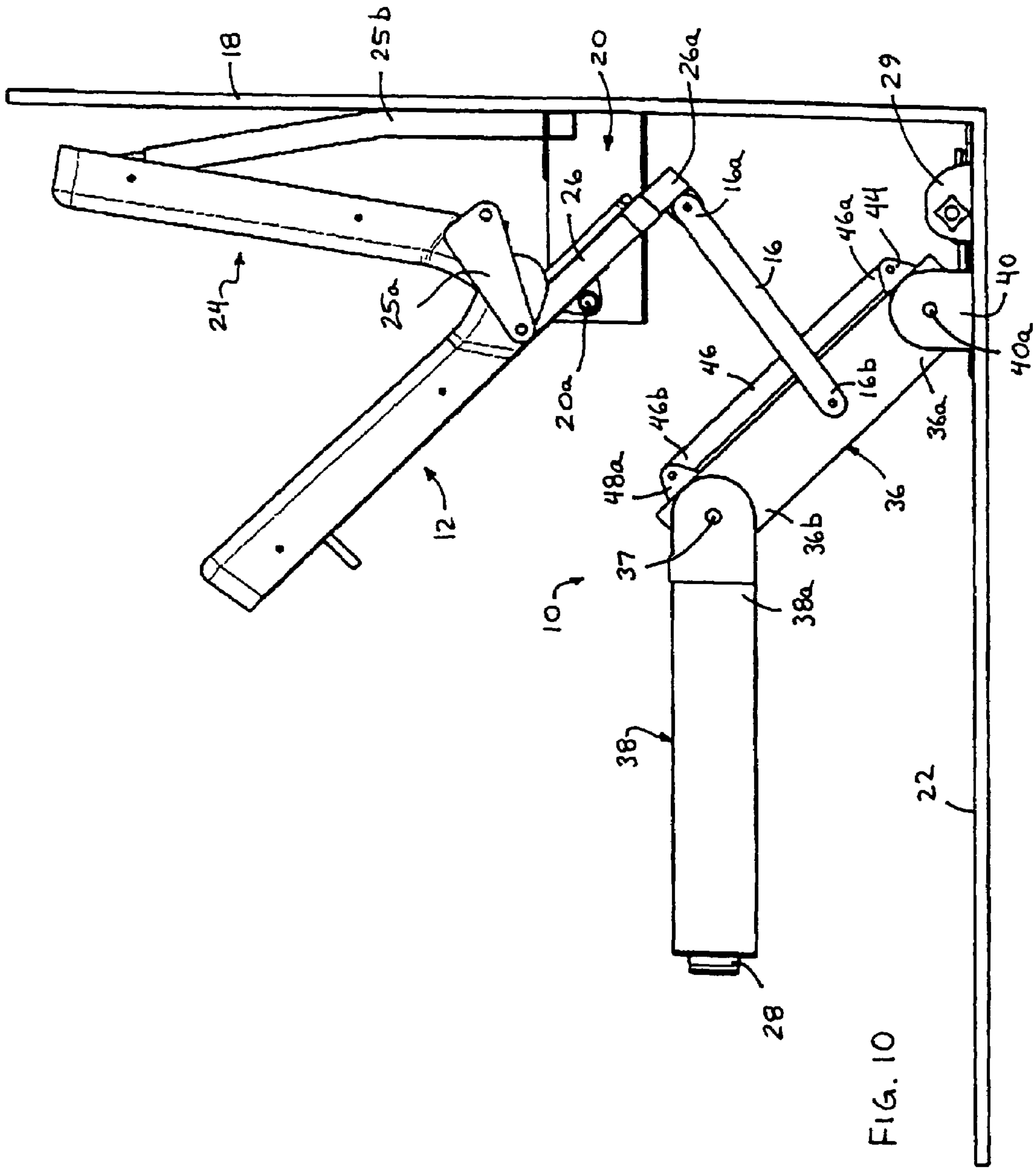
FIG. 10 is an end elevation of the wheelchair holding device and seat of FIGS. 7-9, with the seat moved partially upward to partially extend the wheelchair holding device.
Figure 11:
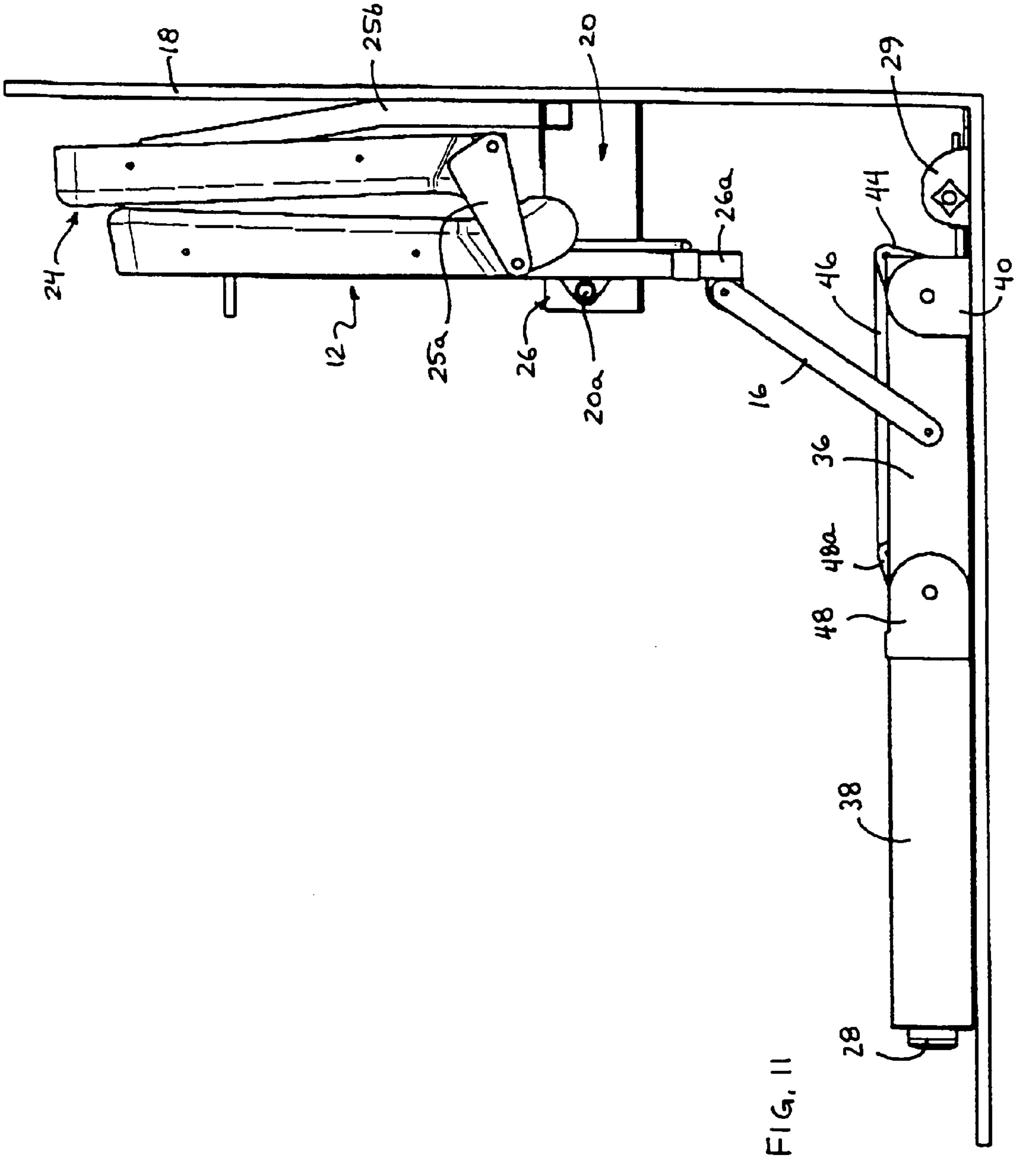
FIG. 11 is an end elevation of the wheelchair holding device and seat of FIGS. 7-10, with the seat moved upward and the wheelchair holding device in its extended or use position.
Figure 12:
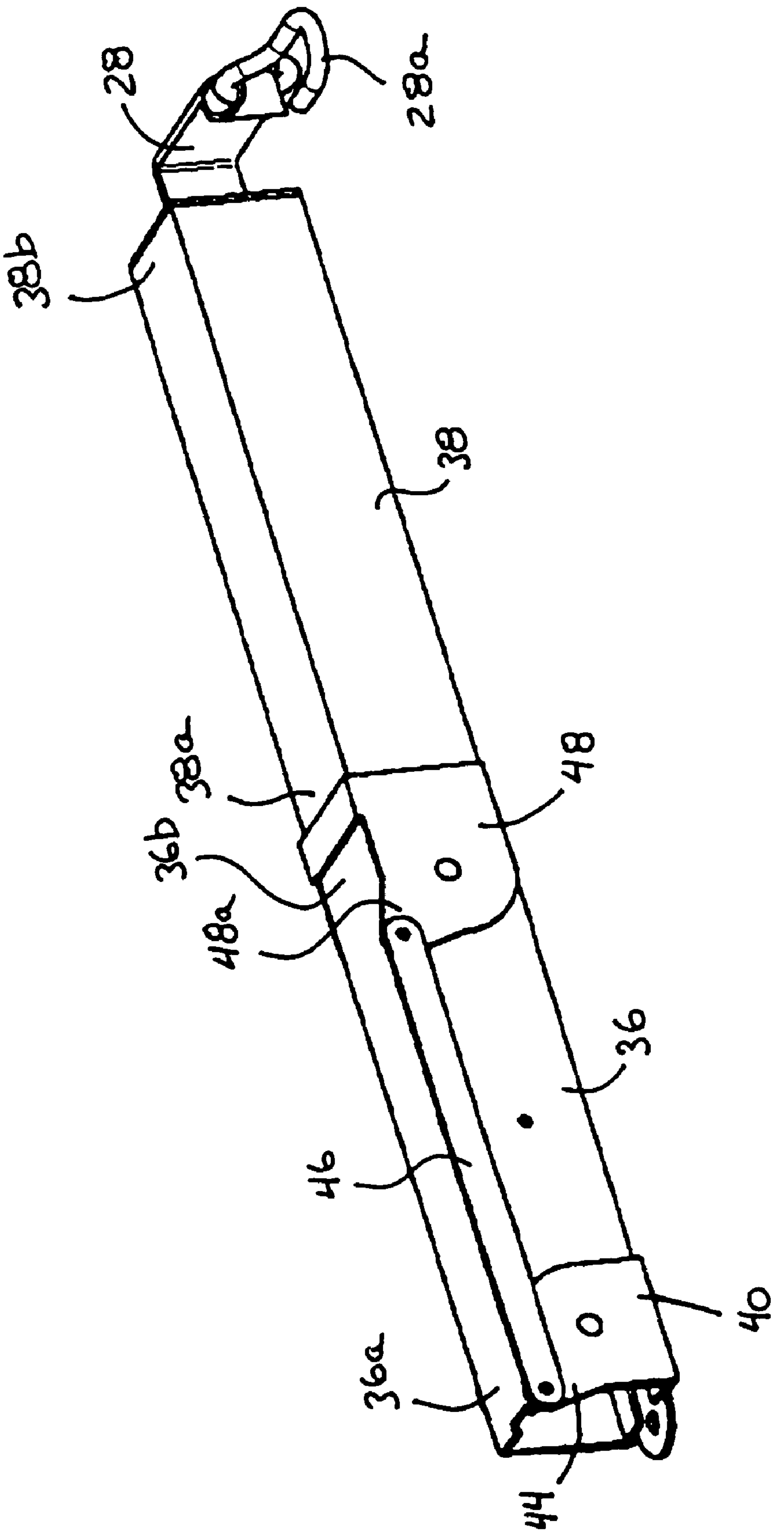
FIG. 12 is a perspective view of a holding arm suitable for use with the wheelchair holding device of the present invention.

As best seen in FIGS. 9-11, seat 12 may include a frame portion 26 that is pivotally mounted to bracket 20 and pivotable about the generally horizontal pivot axis 20*a*. Frame portion 26 may include an extension 26*a* that extends toward the wall 18 from pivot axis 20*a* when the seat is in its use position, such that pivotal movement of seat 12 about pivot axis 20*a* causes a generally arcuate and downward movement of extension 26*a* about pivot axis 20*a*, as discussed below. As can be seen in FIGS. 1-7 and 9-11, an end 16*a* of linkage 16 may be pivotally attached to extension 26*a* and spaced from the pivot axis 20*a*, such that pivotal movement of seat 12 causes linkage 16 to be moved generally vertically to move holding device 10, as also discussed below.

Wheelchair holding device 10 is positioned at the vehicle so that the holding device is generally at an end region of the wheelchair holding area 14 when in the holding position. Wheelchair holding device 10 is configured to attach to or hold an end portion of a wheelchair 15, such as a forward portion of a wheelchair as shown in FIGS. 1-5. In the illustrated embodiment, the wheelchair holding device 10 includes an attachment element 28, such as a flexible member or strap or belt or the like, with a hook or attaching member 28*a* (such as a clip or tie or hook or the like) at an end thereof for attaching to or hooking the wheelchair 15. The attachment element 28 may extend from an outer end of the wheelchair holding device 10 and may be wound or coiled around a spool in a housing 29. In the illustrated embodiment, the housing 29 is mounted to the vehicle floor 22 and the attachment element 28 extends along the holding device and extends from the end of the holding device for attachment to the wheelchair, as discussed below. When the wheelchair holding device is in its wheelchair holding position (such as generally along the floor or support surface of the vehicle), the attachment element may be pulled from the housing to reach the wheelchair and may be tensioned by a tensioning device within the housing 29. The housing 29 may include a tensioning device, as is known in the seat belt and wheelchair tie down arts, to provide tension to the attachment element so that the attachment element holds the wheelchair and limits or substantially precludes movement of the wheelchair in the direction away from the holding device 10. Such tensioning elements or belts or straps are well known in the seat belt and/or wheelchair holding art, and thus will not be discussed in detail herein.

The vehicle may also include one or more straps or belts 30*a*, 30*b* at the other end of the wheelchair holding area 14 (such as at a partition 32 or the like) for attaching to and holding the other end of the wheelchair. The straps or belts 30*a*, 30*b* may be tensioning straps or belts that are extendable from and retractable into a housing, similar to the attachment element 28 described above. Optionally, another attachment element 34 (such as a tensioning strap or belt and housing) may be positioned at the end of the wheelchair holding area at which wheelchair holding device 10 is positioned, in order to connect to the wheelchair at another corner location. The wheelchair 15 thus may be substantially held in place at the wheelchair holding area by the attachment element 28 of holding device 10 and the other tensioning straps or belts 30*a*, 30*b*, 34. Although shown with four elements or members or straps or belts, more or less elements, which may comprise flexible straps or belts or other means for attaching to the wheelchair, may be implemented at other locations generally around the wheelchair, without affecting the scope of the present invention.

In the illustrated embodiment, holding device 10 includes a pair of elongated arms or members 36, 38 that are pivotally attached and pivotable relative to one another. Elongated arm or member 36 is pivotally attached to a base or mounting bracket 40, which is mounted to the floor 22 of the vehicle, preferably generally near to the wall and out of the way from the wheelchair holding area 14. A lower or base end 36*a* of arm 36 is pivotally attached to base 40 and is pivotable about a pivot pin or axis 40*a* at base 40. The other or lower end 16*b* of linkage 16 is pivotally attached to arm 36 at a location on arm 36 that is spaced outward along the arm from the pivot axis 40*a*. Likewise, base 40 includes a bracket or tab or flange 44 (FIGS. 9-11) extending generally upwardly and toward the wall 18 (away from the wheelchair holding area) and spaced from the pivot axis 40*a*. Bracket or tab 44 pivotally attaches to an end 46*a* of another linkage or member 46 for pivoting the outer arm 38 relative to the inner arm 36, as discussed below.

An inner end 38*a* of the other or outer arm or member 38 is pivotally attached to an outer end 36*b* of inner arm 36, such that outer arm 38 is pivotable relative to inner arm 36 and about a pivot axis 37 in response to movement of inner arm 36 and linkage 46, as discussed below. Outer arm 38 may include or attach to a bracket 48 at inner end 38*a* of outer arm 38, which, in turn, is pivotally attached to outer end 36*b* of inner arm 36. Bracket 48 (or the inner end 38*a* of arm 38) may include a tab or flange 48*a*, at which the other end 46*b* of linkage 46 may be pivotally attached. The end 46*b* of linkage 46 is mounted or connected to tab 48*a* of bracket 48 at a location spaced from the pivot axis 37 so that movement of linkage 46 causes a corresponding pivotal movement of arm 38 relative to arm 36 and about pivot axis 37, as discussed below. The attachment element 28 extends from an outer end 38*b* of arm 38, such as through a slot 38*c* formed in arm 38, for attaching to a wheelchair when the wheelchair is positioned at the wheelchair holding area 14 and holding device 10 is moved to the extended or wheelchair holding position.

Optionally, and as shown in FIGS. 1-11, housing 29 of attachment element 28 may be mounted to the floor 22 of the vehicle generally next to or near base or bracket 40, while attachment element 28 may be routed through and/or along arms 36, 38 so as to extend through slot or opening 38*c* at outer end 38*b* of outer arm 38 and to a wheelchair 15 at the wheelchair holding area 14. The arms 36, 38 may include rollers and/or guides or the like (not shown) positioned within the arms and generally at each end thereof to guide attachment element 28 through the arms and to allow for extension and retraction of the attachment element without binding or excessive wearing of the attachment element as it moves through the arms 36, 38, and as the arms are pivoted and moved relative to one another and relative to the vehicle and housing 29.

Figure 14:
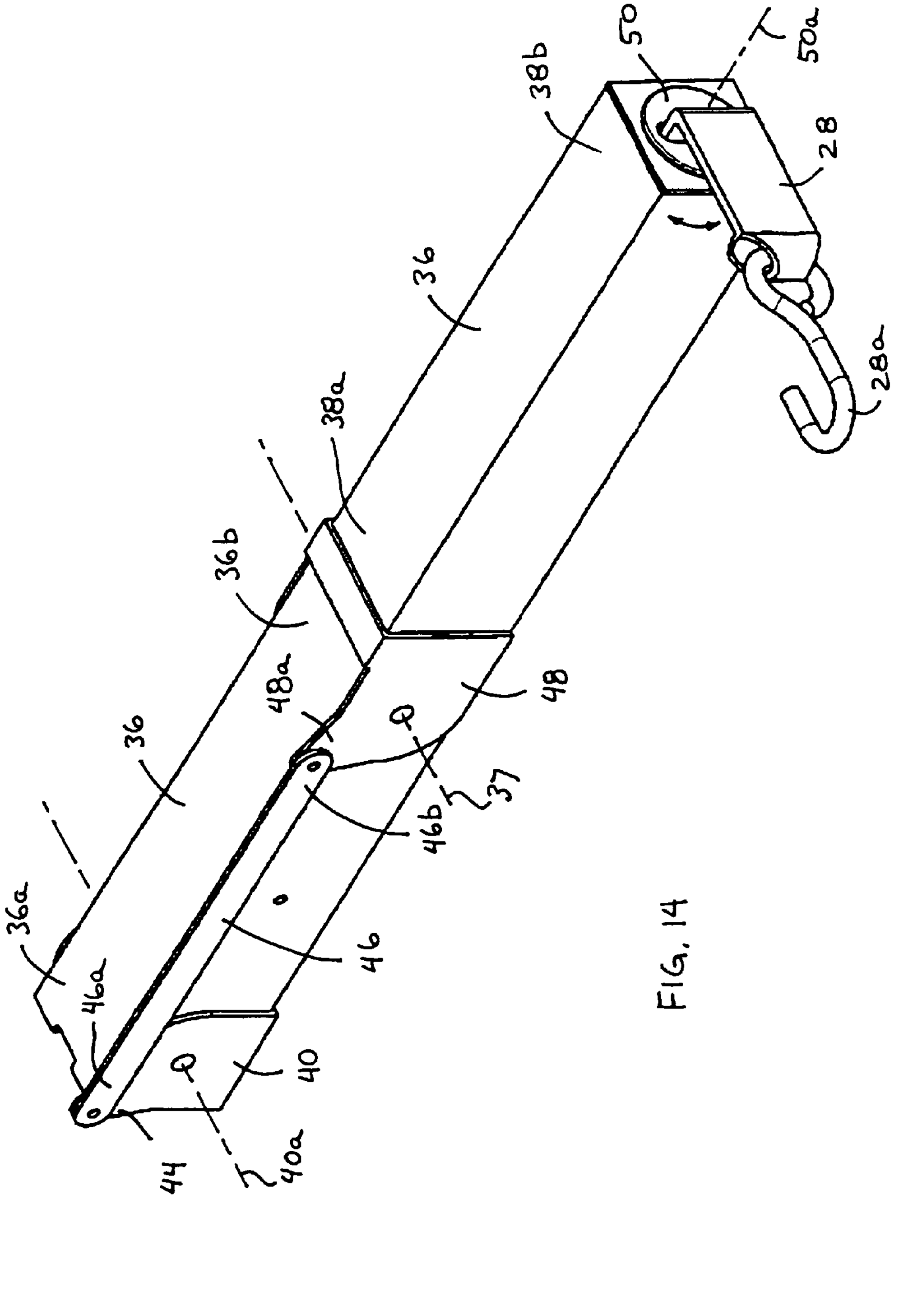
FIG. 14 is another perspective view of a holding arm suitable for use with the wheelchair holding device of the present invention, with a pivotable belt guide at the outer end of the holding arm.
Figure 15:
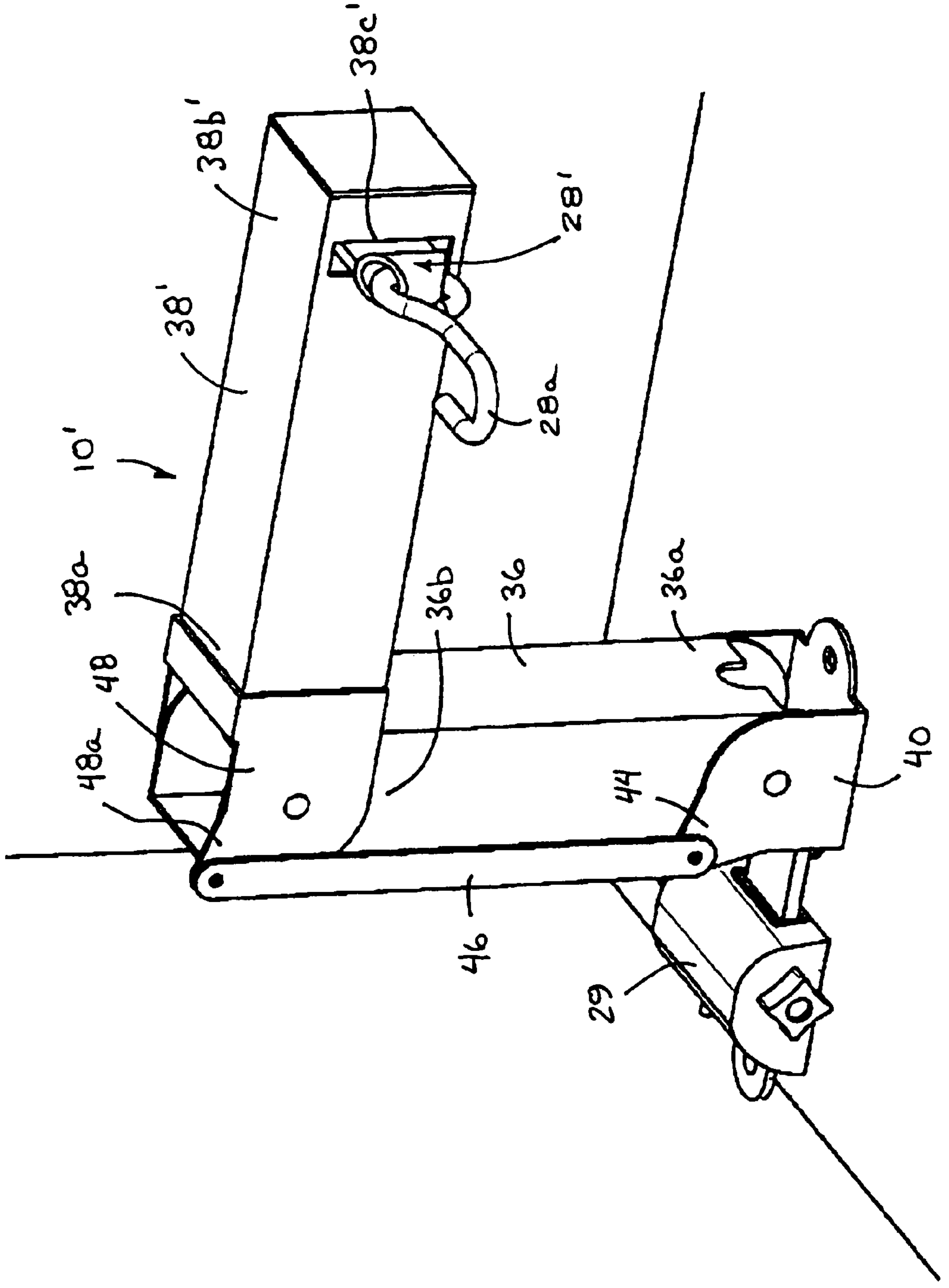
FIG. 15 is a perspective view of another wheelchair holding device in accordance with the present invention, shown in its retracted or storage position.
Figure 16:
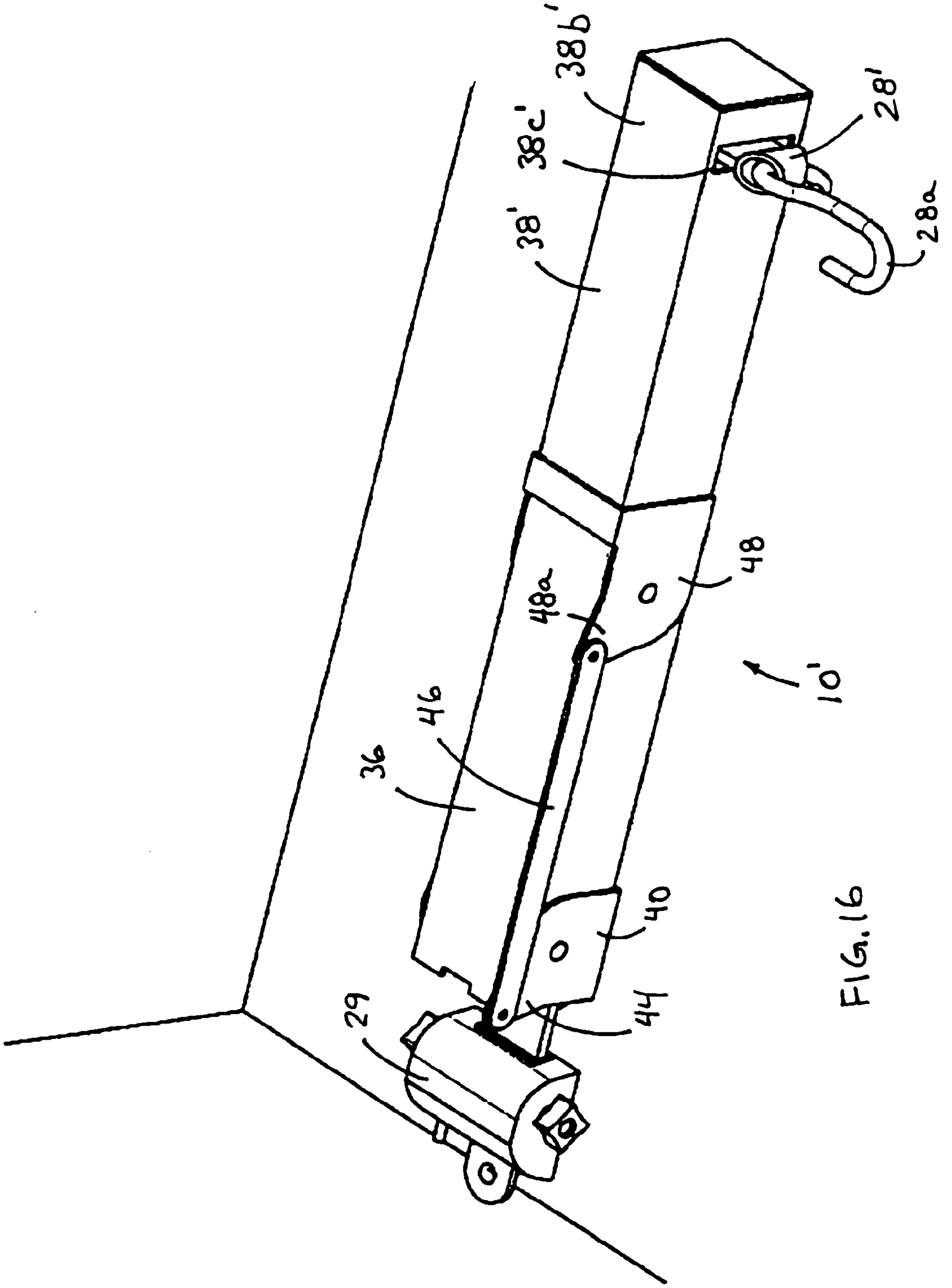
FIG. 16 is a perspective view of the wheelchair holding device of FIG. 15, shown in its extended or use position.
Figure 17:
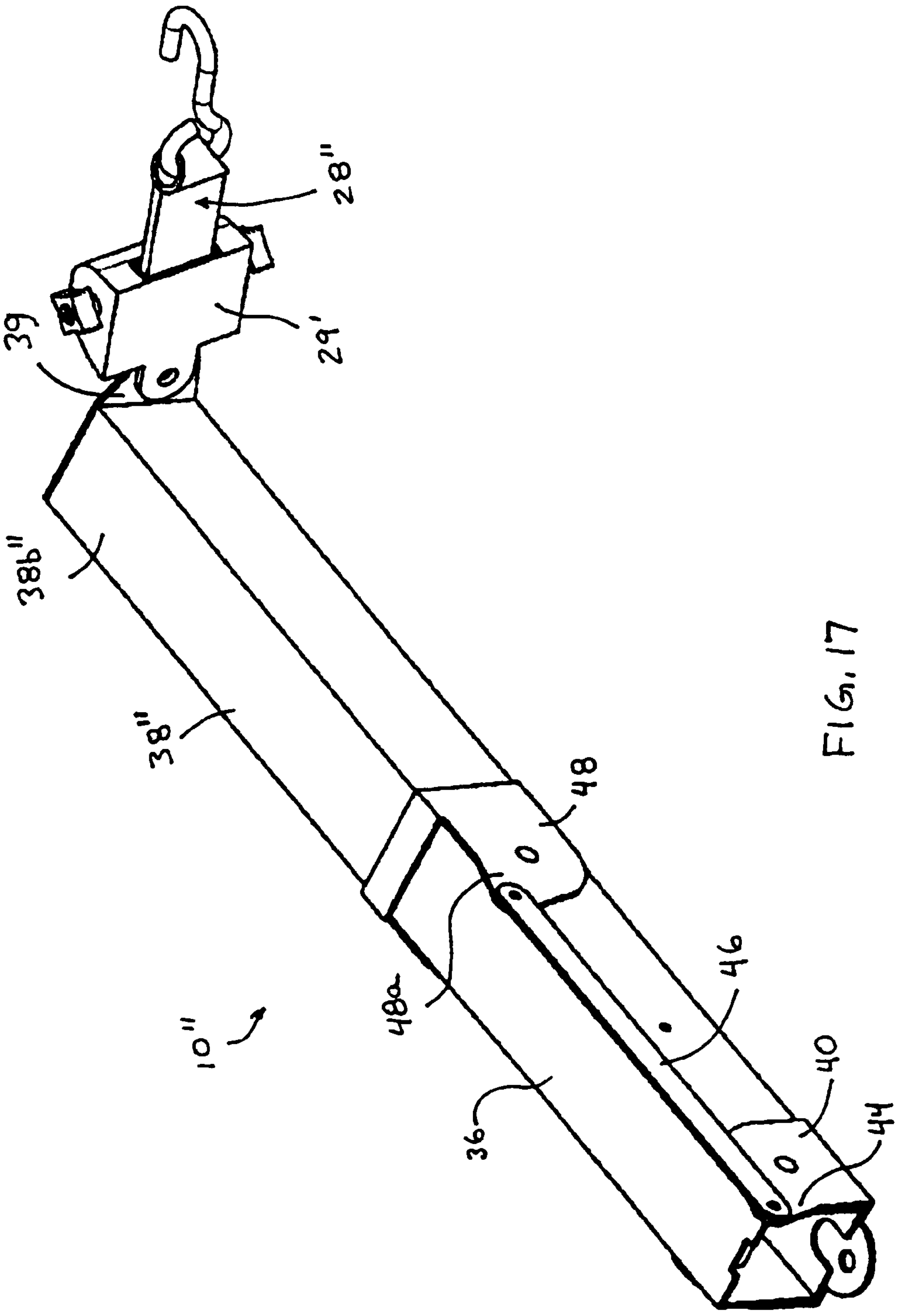
FIG. 17 is a perspective view of another wheelchair holding device in accordance with the present invention, with a belt housing at the outer end of the holding arm.

Optionally, and with reference to FIG. 14, the end 38*b* of outer arm 38 may include or receive a pivotably routing or guiding member 50 for guiding attachment element 28 therethrough. The pivotable or rotatably guiding member 50 may pivot about an axis 50*a* extending generally along arm 38 to assist in aligning the attachment element with the desired location on the wheelchair to limit or minimize twisting or kinking of the attachment element between the outer end 38*b* of arm 38 and the wheelchair 15. Optionally, and with reference to FIGS. 15 and 16, the attachment element 28' (such as a strap or belt or the like) may extend from a slot 38*c*' that is formed along a side wall at or near the outer end 38*b*' of the outer arm 38' of a wheelchair holding device 10'. Optionally, and as shown in FIG. 17, a housing 29' of an attachment element or strap or belt 28" for a wheelchair holding device 10" may be mounted at outer end 38*b*" of outer arm 38". For example, the housing 29' may be pivotally mounted to end 38*b*" of arm 38" (such as at a bracket 39) to allow for adjustment of the angle of the attachment element 28" and housing 29" relative to the arm 38". The wheelchair holding device 10', 10" may otherwise be substantially similar to wheelchair holding device 10, such that a detailed description of the wheelchair holding devices will not be repeated herein. The common or substantially common components of the wheelchair holding devices are shown in the drawings with the same reference numbers. Other means for providing an attachment element or strap or belt at or near an outer end of the wheelchair holding device may be implemented without affecting the scope of the present invention.

Accordingly, when no wheelchair is in the vehicle, and the wheelchair holding area is thus not needed for holding a wheelchair, seat 12 may be lowered or set into its generally horizontal, in-use position. When in this position, end 16*b* of linkage 16 is raised upward via pivotal movement of extension 26*a*, which pulls upward at arm 36 to pivot arm 36 to its generally vertical orientation, as can be seen with reference to FIGS. 7-9. Likewise, as arm 36 is pivoted upward by linkage 16, the other linkage 46 (attached to tab 44 of base 40) causes outer arm 38 to pivot downward or in the opposite direction relative to inner arm 36, as can be seen with reference to FIGS. 9-11. The linkage 16 thus pivots inner arm 36 as seat 12 is lowered, while the linkage 36 likewise pivots outer arm 38 relative to inner arm 36, due to the geometries of the base bracket or tab 44 and the outer arm tab 48*a* as spaced from the respective pivot axes 40*a*, 37. When the seat 12 is fully lowered to its generally horizontal position, the seat is usable by passengers of the vehicle, while the wheelchair holding device is folded up beneath the seat and out of the way of the passengers (FIGS. 7-9), and thus substantially not interfering with the floor space at the seat.

When it is necessary to hold a wheelchair at the wheelchair holding area 14, the seat 12 may be lifted or raised or moved from its generally horizontal orientation to its storage or generally vertical or non-use orientation or position. As the seat 12 is raised, linkage 16 is lowered via extension 26*a* pivoting or moving downward, whereby linkage 16 moves or pivots arm 36 downward about pivot axis 40*a* and toward the floor 22 of the vehicle. As inner arm 36 pivots downwardly, linkage 46 causes a corresponding pivotal movement of outer arm 38 relative to inner arm 36 and about pivot axis 37 in generally the opposite direction of rotation so that outer arm 38 moves toward an aligned orientation with respect to inner arm 36. When the seat 12 is fully raised, additional space is provided at the wheelchair holding area, and the wheelchair holding device is fully extended and positioned generally along the floor 22 at or near the end region of the wheelchair holding area 14. The attachment element 28 may then be extended or pulled from the slot or opening 38*c* at end 38*b* of outer arm 38 and from the housing 29, and may be hooked or otherwise attached or secured to a wheelchair positioned at the wheelchair holding area. Other straps or belts or members or elements may be attached at the other end of the wheelchair and/or at another location at the same end of the wheelchair and/or at any other location as desired, such that the wheelchair may be substantially secured in place at the wheelchair holding area 14.

When it is no longer necessary to secure the wheelchair in the wheelchair holding area, the attachment element (along with the tensioning element or elements elsewhere around or at the wheelchair holding area) may be disconnected from the wheelchair and the attachment element may be retracted at least partially into the housing (and the other tensioning elements may also be retracted in a similar manner). The seat 12 may then be lowered to its generally horizontal or use position, which in turn raises the wheelchair holding device to its storage position, as described above. When returned to its storage position, the inner arm is generally vertically positioned at or near the wall of the vehicle, while the outer arm is generally horizontally positioned along an underside of the vehicle seat and out of the way of the seating area. The wheelchair holding device of the present invention thus provides for movement of the holding device between a stored position, where it does not substantially interfere with the floor space at the seating area at the vehicle seat, and an extended or wheelchair holding position, where the holding device is positioned at the wheelchair holding area for holding or securing a wheelchair at the area when the seat is moved or removed from the area. The wheelchair holding device may be moved between the stored position and the wheelchair holding position as the vehicle seat is moved between its use position and non-use position, such that no further manual operations are required to set up the wheelchair holding area for a wheelchair other than moving or lifting or pivoting the seat to its non-use or raised or storage position.

Although shown and described as having the seat linkage connect between a frame extension of the seat and a middle region of the inner arm, it is envisioned that other linkages or mechanisms or connecting means may be implemented between the seat or seat frame and the wheelchair holding device so as to cause movement of the wheelchair holding device in response to movement of the vehicle seat, without affecting the scope of the present invention. For example, a linkage or member may be connected to the seat at a location outward and away from the vehicle wall (or partition or bulkhead or the like) from the pivot axis of the seat, such that raising the seat lifts the linkage. The other end of the linkage may then be connected to a bracket or extension of the inner arm of the wheelchair holding device. The extension at the end of the inner arm may be spaced from the pivot axis of the arm and may extend generally toward the wall of the vehicle, whereby raising the seat lifts upward on the linkage, which in turn imparts a downward rotation or pivotal movement of the arm toward the vehicle floor, and whereby lowering the seat lowers the linkage, which in turn imparts an upward rotation or pivotal movement of the arm away from the vehicle floor. Other moving or connecting means may be implemented between the wheelchair holding device and a support member or seat or platform or the like of a vehicle, without affecting the scope of the present invention.

Figure 13:
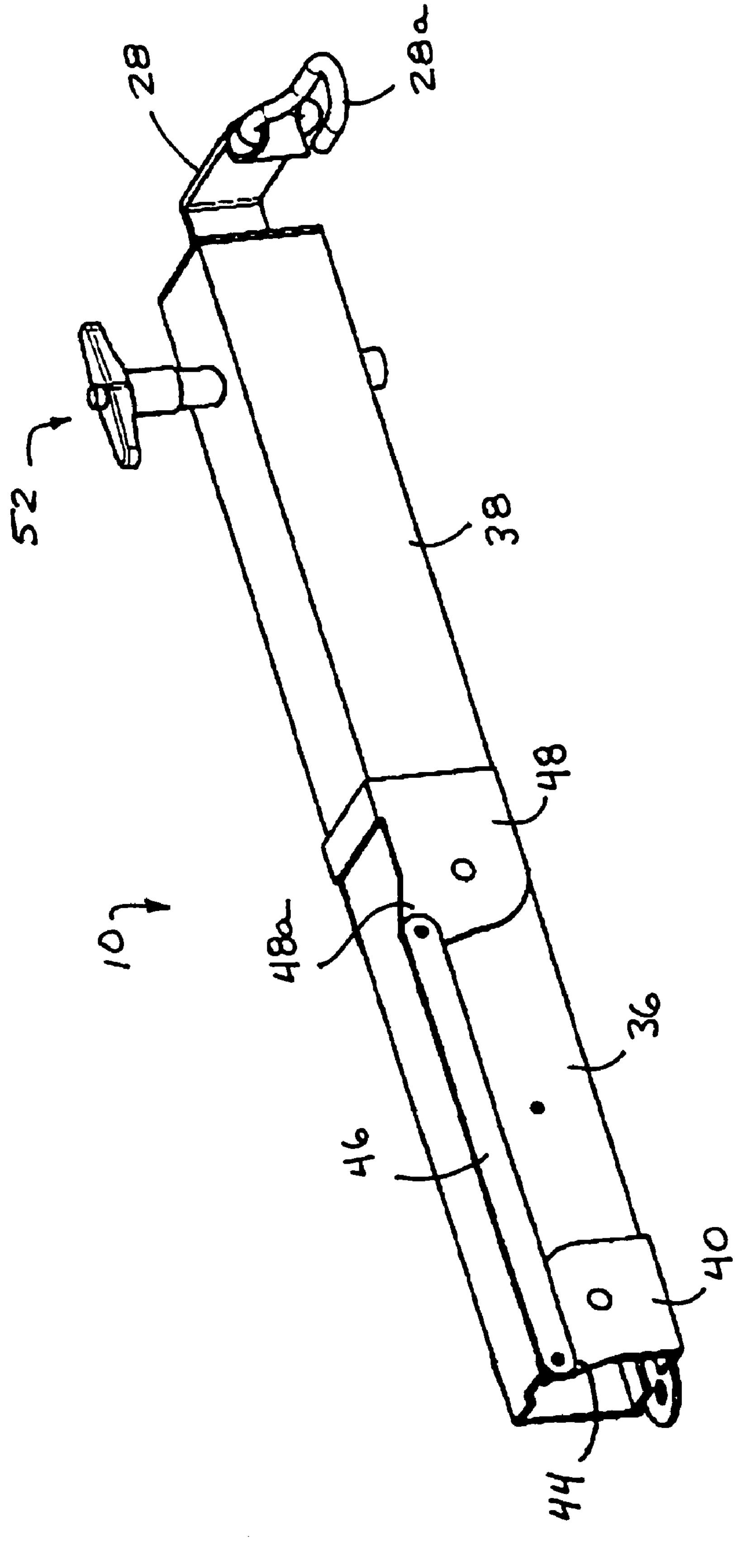
FIG. 13 is another perspective view of a holding arm suitable for use with the wheelchair holding device of the present invention, with a securing pin at an outer end of the holding arm.

Optionally, and with reference to FIG. 13, a locking device or pin 52 may be used to secure the arm or arms 36, 38 of holding device 10 to the vehicle when the holding device 10 is in its extended or wheelchair holding position. For example, locking device 52 may extend through outer arm 38 and may engage a locking plate (not shown) at the vehicle floor 22 to secure arm 38 to the floor when the wheelchair holding device is positioned along the floor of the vehicle. The locking device or pin may be pushed into engagement with a locking plate or the like to secure the arm or arms at or to the vehicle floor, and may be pulled upward to disengage from the locking plate when it is desired to move the wheelchair holding device to its storage or retracted position. Such a locking device may be desirable to limit movement of the arms of the wheelchair holding device when in the wheelchair holding position, without affecting the scope of the present invention. However, it is envisioned that the arms and pivot joints of the wheelchair holding device may be structurally robust such that no such locking devices or pins may be necessary to substantially lock or secure or retain the wheelchair holding device in its extended or wheelchair holding position.

Although shown and described as having a pair of arms that pivot to extend and retract in response to movement of the vehicle seat, the wheelchair holding device may otherwise comprise a single arm of sufficient length to extend outward and position the attachment element at a desired or appropriate location at or near to the wheelchair holding area, without affecting the scope of the present invention. Also, although shown and described as being pivotable between the storage position and the extended in-use position, the wheelchair holding device may be otherwise moved to the extended in-use position as the seat is raised, without affecting the scope of the present invention. For example, it is envisioned that a wheelchair holding device in accordance with the present invention may include a slidable or longitudinally or linearly movable member that may be slidably or longitudinally movable or extendable outward from a base portion as the seat is raised to the non-use position, and that may be retractable at least partially into the base portion as the seat is lowered to the use position. Other means for moving or extending a wheelchair holding device may be connected to or cooperatively operable or movable with the seat so as to extend/retract as the seat is moved, without affecting the scope of the present invention.

Therefore, the present invention provides a wheelchair holding device that is movable between a storage or non-use or retracted position and an extended or wheelchair holding position in response to movement of a vehicle seat between a lowered or use position and a raised or non-use position, respectively. The wheelchair holding device thus is correspondingly moved with the vehicle seat so that an operator need only raise the seat to its storage position to set up the wheelchair holding device at a wheelchair holding area. The wheelchair holding device of the present invention is moved to a wheelchair holding position as the vehicle seat is moved to a storage position to make room for a wheelchair. The wheelchair holding device may then be readily connected to a wheelchair positioned at the wheelchair holding area at or near to the extended or accessible wheelchair holding device. The present invention thus substantially reduces the manual labor that is typically otherwise involved in setting up known or conventional wheelchair holding areas.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A combination comprising:

a vehicle having a support member movably mounted at said vehicle and movable between a generally horizontal use position and a non-use position, said vehicle having a wheelchair holding area for positioning a wheelchair at when said support member is in said non-use position; and a wheelchair holding device for holding a wheelchair at said wheelchair holding area, said wheelchair holding device being movable between a storage position and a wheelchair holding position where at least a portion of said wheelchair holding device is positioned at said wheelchair holding area, said wheelchair holding device comprising an attachment element that is configured to attach to a wheelchair positioned at said wheelchair holding area, said wheelchair holding device being interconnected to said support member and being moved toward said wheelchair holding position as said support member is moved toward said non-use position.

2. The combination of claim 1, wherein said support member comprises a vehicle seat for supporting a person when in said generally horizontal use position.

3. The combination of claim 1, wherein said wheelchair holding device includes an elongated member that is pivotable between said storage position and said wheelchair holding position.

4. The combination of claim 3, wherein said attachment element extends from said elongated member at an end region of said elongated member.

5. The combination of claim 4, wherein said end region is positioned at a holding location at said wheelchair holding area when said wheelchair holding device is in said wheelchair holding position and is positioned at an area remote from said holding location when said wheelchair holding device is in said storage position.

6. The combination of claim 4, wherein said attachment element comprises a flexible strap.

7. The combination of claim 6, wherein said flexible strap extends from a housing that retracts said flexible strap at least partially therein when said flexible strap is not in use.

8. The combination of claim 7, wherein said housing is mounted to said vehicle and said flexible strap extends along said elongated member between said housing and said end region.

9. The combination of claim 7, wherein said housing is mounted at said end region of said elongated member.

10. The combination of claim 3, wherein said elongated member comprises a first member and a second member movably attached to said first member, said second member moving relative to said first member as said wheelchair holding device moves to said wheelchair holding position, said attachment element extending from an end portion of said second member that is remote from said first member.

11. The combination of claim 10, wherein said second member is pivotally attached to said first member.

12. The combination of claim 11, wherein said first member is pivotally attached to a mounting bracket of said vehicle and is pivoted relative thereto as said support member is moved toward said non-use position.

13. The combination of claim 12 including a first linkage connected to said support member and to said first member and a second linkage connected to said mounting bracket and said second member, said first linkage being configured to pivot said first member relative to said mounting bracket as said support member is moved between said use position and said non-use position, said second linkage being configured to pivot said second member relative to said first member as said first member is pivoted relative to said mounting bracket.

14. The combination of claim 1 including a linkage connected to said support member and to said wheelchair holding device, said linkage being configured to move at least a portion of said wheelchair holding device as said support member is moved between said use position and said non-use position.

15. The combination of claim 14, wherein said linkage pivots a portion of said wheelchair holding device toward said wheelchair holding position as said support member is moved toward said non-use position and pivots said portion of said wheelchair holding device toward said storage position as said support member is moved toward said use position.

16. The combination of claim 1, wherein said wheelchair holding device is substantially secured in said wheelchair holding position via a locking device.

17. A combination comprising:

a vehicle having a seat that is movable between a generally horizontal use position and a non-use position, said vehicle having a wheelchair holding area for positioning a wheelchair at when said seat is in said non-use position; and a wheelchair holding device for holding a wheelchair at said wheelchair holding area, said wheelchair holding device comprising at least one elongated member and an attachment strap extending from an end portion of said at least one elongated member, said attachment strap being configured to attach to a wheelchair positioned at said wheelchair holding area, said at least one elongated member being pivotable between a wheelchair holding position, where said end portion is positioned at a securing location at said wheelchair holding area, and a storage position, where said end portion is positioned remote from said securing location, said at least one elongated member being interconnected to said seat and being moved toward said wheelchair holding position as said seat is moved toward said non-use position.

18. The combination of claim 17, wherein said attachment strap extends from a housing that retracts said attachment strap at least partially therein when said attachment strap is not in use.

19. The combination of claim 17, wherein said at least one elongated member comprises a first member and a second member pivotally attached to said first member, said second member pivoting relative to said first member as said wheelchair holding device moves to said wheelchair holding position, said attachment strap extending from an end portion of said second member that is remote from said first member.

20. The combination of claim 19 including a first linkage connected to said seat and to said first member and a second linkage connected to the vehicle and said second member, said first linkage being configured to pivot said first member as said seat is moved between said use position and said non-use position, said second linkage being configured to pivot said second member relative to said first member as said first member is pivoted relative to the vehicle.

21. The combination of claim 20, wherein said first member and said second member are positioned generally horizontally when said wheelchair holding device is in said wheelchair holding position.

22. The combination of claim 21, wherein said first member is generally vertical and said second member is generally horizontal and generally along an underside of said seat when said wheelchair holding device is in said storage position.

23. The combination of claim 17 including a linkage connected to said seat and to said at least one elongated member, said linkage being configured to pivot said at least one elongated member as said seat is moved between said use position and said non-use position, said linkage pivoting said at least one elongated member toward said wheelchair holding position as said seat is moved toward said non-use position and said linkage pivoting said at least one elongated member toward said storage position as said seat is moved toward said use position.

24. The combination of claim 17, wherein said at least one elongated member is substantially secured in said wheelchair holding position via a locking device.

25. A method for securing a wheelchair at a wheelchair holding area of a vehicle, said method comprising:

providing a vehicle having a wheelchair holding area and a support member at or near said wheelchair holding area;

providing a wheelchair holding device for holding a wheelchair at said wheelchair holding area;

connecting said wheelchair holding device to said support member;

moving said support member from a use position to a non-use position, whereby the movement of said support member to said non-use position imparts a corresponding movement of said wheelchair holding device to move said wheelchair holding device to a wheelchair holding position, where an attachment element of said wheelchair holding device is positioned at or near said wheelchair holding area; and connecting said attachment element of said wheelchair holding device to a wheelchair positioned at said wheelchair holding area.

26. The method of claim 25, wherein moving said support member from a use position to a non-use position comprises pivoting a vehicle seat from a generally horizontal orientation to a generally vertical orientation.

27. The method of claim 26, wherein pivoting said vehicle seat imparts a pivotal movement of an elongated member of said wheelchair holding device to move said wheelchair holding device to said wheelchair holding position.

28. The method of claim 27, wherein said wheelchair holding device comprises at least one elongated member that is pivotally attached to said vehicle and is pivoted to said wheelchair holding position in response to movement of said support member toward said non-use position.

29. The method of claim 28, wherein said wheelchair holding device comprises first and second elongated members pivotally connected together, one end of said first elongated member being pivotally attached to a mounting bracket of said vehicle and said second elongated member being pivotally attached to the other end of said first elongated member.

30. The method of claim 29, wherein connecting said wheelchair holding device to said support member comprises connecting a first linkage between said support member and said first elongated member and connecting a second linkage between said mounting bracket of the vehicle and said second elongated member such that movement of said support member imparts pivotal movement of said first elongated member via said first linkage, said pivotal movement of said first elongated member in turn imparts pivotal movement of said second elongated member relative to said other end of said first elongated member via said second linkage.

31. The method of claim 25 including:

removing the wheelchair from said wheelchair holding area; and moving said support member from said non-use position to said use position, whereby said movement of said support member to said use position imparts a movement of said wheelchair holding device to move said wheelchair holding device from said wheelchair holding position to a storage position where said attachment element is remote from said wheelchair holding area.

32. The method of claim 25 including securing said at least one elongated member to the vehicle in said wheelchair holding position via a locking device.

33. A combination comprising:

a vehicle having a wheelchair holding area for positioning a wheelchair thereat;

a wheelchair holding device for holding a wheelchair at said wheelchair holding area, said wheelchair holding device comprising a base, first and second elongated members and an attachment strap extending from an end portion of said second elongated member, said base being attached to said vehicle, said attachment strap being configured to attach to a wheelchair positioned at said wheelchair holding area; and wherein said first elongated member is pivotally mounted at said base and said second elongated member is pivotally attached at an end of said first elongated member that is opposite from said base, said first and second elongated members being pivotable between a wheelchair holding position, where said first and second elongated members are generally aligned with one another and arranged substantially horizontally so that said end portion is positioned at a securing location at said wheelchair holding area, and a storage position, where said second elongated member is at an angle relative to said first elongated member and said end portion of said second elongated member is positioned remote from said securing location.

34. The combination of claim 33, wherein said first elongated member is pivotable about a first generally horizontal pivot axis at said base.

35. The combination of claim 34, wherein said first elongated member is generally vertical when said first and second elongated members are in said storage position.

36. The combination of claim 35, wherein said second elongated member is pivotable about a second generally horizontal pivot axis at said end of said first elongated member.

37. The combination of claim 36, wherein said second elongated member is generally horizontal and generally along an underside of said seat when said first and second elongated members are in said storage position.

38. The combination of claim 33, wherein said vehicle further comprises a seat that is movable between a generally horizontal use position and a non-use position, said wheelchair holding area being configured for positioning a wheelchair thereat when said seat is in said non-use position.

39. The combination of claim 38, wherein at least one of said first and second elongated members is interconnected to said seat and is moved toward said wheelchair holding position as said seat is moved toward said non-use position.

40. The combination of claim 33, wherein said attachment strap extends from a housing that retracts said attachment strap at least partially therein when said attachment strap is not in use.

41. The combination of claim 40, wherein said housing is mounted at said vehicle and near said base, said attachment strap being routed along said first and second elongated members and exiting said end portion of said second elongated member.

42. The combination of claim 41, wherein said attachment strap is routed at least partially within said first and second elongated members between said base and said end portion of said second elongated member.

43. A combination comprising:

a vehicle having a wheelchair holding area for positioning a wheelchair thereat;

a wheelchair holding device for holding a wheelchair at said wheelchair holding area, said wheelchair holding device comprising a base attached to said vehicle, at least one elongated member pivotally mounted at said base, and an attachment device;

said at least one elongated member being movable between a wheelchair holding position, where said at least one elongated member is arranged so that an end portion is positioned at a securing location at said wheelchair holding area, and a storage position, where said end portion of said at least one elongated member is positioned remote from said securing location;

said attachment device comprising a housing and an attachment strap that extends from said housing, said housing being configured to retract said attachment strap at least partially therein when said wheelchair holding device is not in use; and wherein said housing of said attachment device is mounted at said vehicle and near said base of said wheelchair holding device, said attachment strap extending from said housing and being routed along said at least one elongated member and extending from said end portion, said attachment strap being configured to attach to a wheelchair positioned at said wheelchair holding area.

44. The combination of claim 43, wherein said attachment strap is routed at least partially within said at least one elongated member between said base and said end portion.

45. The combination of claim 43, wherein said at least one elongated member is pivotable about a first generally horizontal pivot axis at said base.

46. The combination of claim 45, wherein said at least one elongated member is generally vertical when said at least one elongated member is in said storage position.

47. The combination of claim 43, wherein said at least one elongated member comprises a first member pivotally attached to said base and a second member pivotally attached to said first member, said second member pivoting relative to said first member as said wheelchair holding device moves to said wheelchair holding position, said attachment strap extending from an end portion of said second member that is remote from said first member.

48. The combination of claim 47, wherein said first member is pivotable about a first generally horizontal pivot axis at said base and said second member is pivotable about a second generally horizontal pivot axis at an end of said first member.

49. The combination of claim 48, wherein said first member is generally vertical and said second member is generally horizontal and generally along an underside of a vehicle seat when said first and second members are in said storage position.

50. The combination of claim 43, wherein said vehicle further comprises a seat that is movable between a generally horizontal use position and a non-use position, said wheelchair holding area being configured for positioning a wheelchair thereat when said seat is in said non-use position.

51. The combination of claim 50, wherein said at least one elongated member is interconnected to said seat and is moved toward said wheelchair holding position as said seat is moved toward said non-use position.

* * * * *